(12) United States Patent
Erhard et al.

(10) Patent No.: US 6,778,580 B2
(45) Date of Patent: Aug. 17, 2004

(54) LASER AMPLIFIER SYSTEM

(75) Inventors: Steffen Erhard, Gaeufelden (DE); Adolf Giesen, Renningen (DE)

(73) Assignee: Universitaet Stuttgart Institut fuer Strahlwerkzeuge, Stuttgart (DE)

( * ) Notice: Subject to any disclaimer, the term of this patent is extended or adjusted under 35 U.S.C. 154(b) by 0 days.

(21) Appl. No.: 10/208,663

(22) Filed: Jul. 29, 2002

(65) Prior Publication Data

US 2003/0026315 A1 Feb. 6, 2003

Related U.S. Application Data

(63) Continuation of application No. PCT/EP01/01130, filed on Feb. 2, 2001.

(30) Foreign Application Priority Data

Feb. 5, 2000 (DE) .......................... 100 05 194

(51) Int. Cl.$^7$ ............................ H01S 3/08; H01S 3/091
(52) U.S. Cl. ............................ 372/92; 372/70
(58) Field of Search .............................. 372/70, 72, 92, 372/95, 93, 100; 359/346, 859

(56) References Cited

U.S. PATENT DOCUMENTS

| | | | | | |
|---|---|---|---|---|---|
| 3,921,096 A | * | 11/1975 | Chenausky et al. | ........... | 372/95 |
| 3,969,687 A | * | 7/1976 | Freiberg et al. | ............... | 372/95 |
| 4,025,172 A | * | 5/1977 | Freiberg | ..................... | 359/859 |
| 5,014,282 A | * | 5/1991 | Herziger et al. | .............. | 372/93 |
| 5,546,222 A | * | 8/1996 | Plaessmann et al. | ........ | 359/346 |
| 5,553,088 A | * | 9/1996 | Brauch et al. | ................. | 372/34 |
| 6,198,756 B1 | * | 3/2001 | Caprara et al. | ............... | 372/22 |

FOREIGN PATENT DOCUMENTS

| | | |
|---|---|---|
| DE | 40 08 225 | 9/1991 |
| EP | 0 632 551 | 1/1995 |
| WO | 01/03260 | 1/2001 |

OTHER PUBLICATIONS

Druon, F., et al., "High–repetition–rate 300–ps pulsed ultraviolet source with a passively Q–switched microchip laser and a multipass amplifier", *Optics Letters*, Apr. 1, 1999 vol. 24, No. 7, pp. 499–501.

Chambaret, J.P., et al., "Generation of 25–TW, 32–fs pulses at 10 HZ", *Optics Letters*, Dec. 1, 1996 vol. 21, No. 23, pp. 1921–1923.

Olson, Todd E., et al., "Multipass Diode–Pumped Nd:YAG Optical Amplifiers at 1.06 μm and 1.32 μm", *IEEE Photonics Technology Letters*, May 1994, vol. 6, No. 5, pp. 605–608.

\* cited by examiner

*Primary Examiner*—Quyen Leung
*Assistant Examiner*—Hung T Vy
(74) *Attorney, Agent, or Firm*—Barry R. Lipsitz; Douglas M. McAllister

(57) ABSTRACT

The invention relates to a laser amplifier system consisting of a solid body, which comprises a laser-active medium, of an excitation source for producing an excited state of the laser-active medium, and of an amplifier radiation field, which repeatedly permeates the solid body and out of which a laser beam can be decoupled. The aim of the invention is to improve a laser-amplifier system of this type so that the highest number of passages of the amplifier radiation field through the solid body can be attained using optical means that are provided in the most simple possible form. To this end, the invention provides radiation field guiding optics which enable the amplifier radiation field to enter the solid body in the form of a number of incident branches with locally different trajectories, and which enable the amplifier radiation field to exit the solid body in the form of at least one emerging branch with a trajectory that differs locally from those of the incident branches. In addition, the radiation field guiding optics comprise at least one deviating unit which, out of at least one of the branches emerging from the solid body, forms a branch which enters the solid body and which has a trajectory that differs locally from that of said emerging branch.

45 Claims, 28 Drawing Sheets

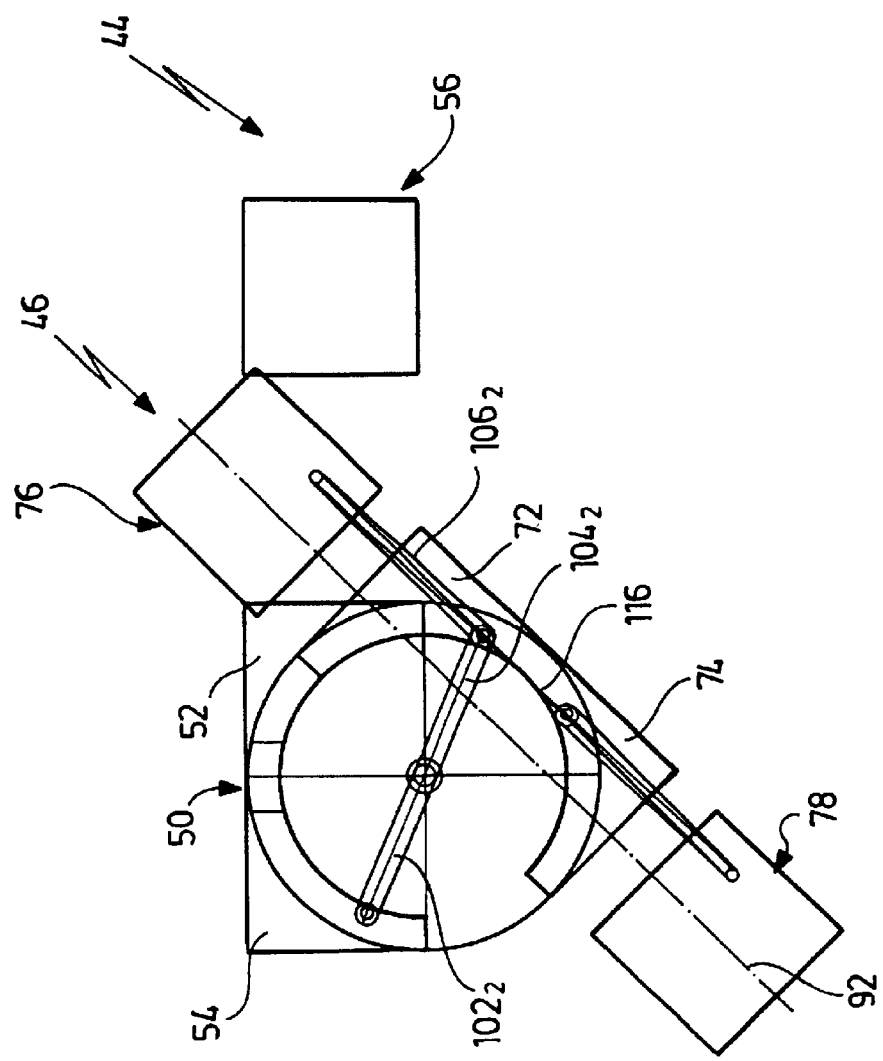
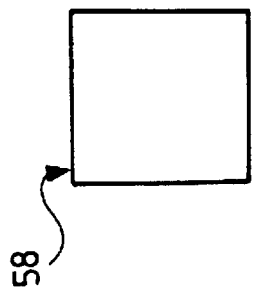
FIG. 16

LASER AMPLIFIER SYSTEM

The present disclosure relates to the subject matter disclosed in PCT application No. PCT/EP01/01130 of Feb. 2, 2001, which is incorporated herein by reference in its entirety and for all purposes.

BACKGROUND OF THE INVENTION

The invention relates to a laser amplifier system comprising a solid body having a laser-active medium, an excitation source for producing an excited state of the laser-active medium, and an amplifier radiation field which passes multiply through the solid body and from which a laser beam can be extracted.

Such a laser amplifier system is known, for example, from EP 0 632 551.

In this laser amplification system, however, the amplifier radiation field is guided, even with multiple passes through the solid body, in such a way that the individual branches are reflected back on themselves.

The disadvantage of an amplifier radiation field formed in this way is that a high number of passes of the amplifier radiation field through the solid body can be achieved only with great difficulty.

It is therefore an object of the invention to improve a laser amplifier system of the generic type in such a way that the highest possible number of passes of the amplifier radiation field through the solid body can be achieved with the simplest possible optical means.

SUMMARY OF THE INVENTION

This object is achieved according to the invention, in the case of a laser amplifier system of the type described in the introduction, by the fact that radiation field guiding optics are provided, which make the amplifier radiation field entering the solid body in the form of a plurality of incident branches with locally different trajectories and leave the solid body in the form of at least one emerging branch with a trajectory locally different from the incident branches, and that the radiation field guiding optics have at least one deviating unit which forms, from at least one of the branches emerging from the solid body, a branch which enters the solid body with a trajectory locally separate from this emerging branch.

The advantage of the solution according to the invention is that it provides a straightforward way of achieving a large number of passes of the amplifier radiation field through the solid body, and at the same time, since the incident branches and the emerging branches respectively have locally different trajectories from one another, optimum utilization of the excited laser-active medium in the solid body takes place.

It is particularly favorable for the incident branches always to enter the same solid body.

It is even more favorable for the incident branches always to enter the same volume region of the solid body.

In order not to increase the size of the cross section of the incident branches formed in turn from emerging branches by the deviating units, provision is preferably made for the radiation field guiding optics to form the incident branch from the emerging branch after intermediate focusing.

The intermediate focusing may in this case take place independently of the deviating unit. In order to configure the beam guiding optics according to the invention as compactly as possible, provision is preferably made for the intermediate focusing to take place in the vicinity of the deviating unit.

A particularly expedient solution in this case provides for an intermediate focus lying between two deviating elements of the deviating unit to be produced by the intermediate focusing, which prevents the intermediate focus from lying directly in a deviating unit.

It is particularly favorable in this case, in order to arrange both deviating elements as far away as possible from the intermediate focus, for the intermediate focus to lie approximately centrally between the two deviating elements.

Since the intensity per unit area of the cross-sectional area of the radiation field increases close to the intermediate focus, provision is preferably made for the optical path between the two deviating elements lying on either side of the intermediate focus to be greater than a spacing between an input branch entering the deviating unit and an output branch emerging from the deviating unit.

It is particularly favorable in this case for the optical path between the two deviating elements lying on either side of the intermediate focus to correspond at least to two times the spacing of the input branch and the output branch.

A particularly favorable solution provides for the deviating unit to guide the amplifier radiation field in a loop which, in relation to an input branch and an output branch of the deviating unit, has an extent in an expansion direction which is greater than the spacing between the input branch and the output branch.

This expansion of the radiation field in the expansion direction provides the opportunity to maintain a spacing which is as large as possible between the deviating elements lying on either side of the intermediate focus.

Preferably, the extent of the loop in the expansion direction is at least two times the spacing between the input branch and the output branch.

In the scope of the exemplary embodiments described so far, it has been assumed that the radiation field guiding optics convert at least one emerging branch into an incident branch by employing a deviating unit.

The solution according to the invention may, however, be refined in a particularly straightforward way if the radiation field guiding optics convert a plurality of emerging branches into a plurality of incident branches by means of at least one deviating unit.

In the scope of the description of the individual exemplary embodiments so far, the way in which the respective incident and emerging branches of the amplifier radiation field are intended to be formed has not been discussed in detail.

In principle, it would be conceivable to embody them as divergent or convergent branches, albeit with the disadvantage that the cross section of the branches would become larger as the number of passes is increased.

In order to be able to keep the cross section of the incident and emerging branches the same size, and therefore to be able to use a volume region of the solid body with excited laser-active medium optimally for amplifying the radiation field, provision is preferably made for the radiation field guiding optics to form an amplifier radiation field in which the branches entering the solid body and the branches emerging from the solid body are collimated branches.

In order respectively to form a collimated incident branch in turn from a collimated emerging branch, provision is preferably made for the radiation field guiding optics to be designed as at least singly recollimating.

In this case, "recollimating" means the conversion of a collimated radiation field via intermediate focusing into a collimated radiation field.

It is even better for the radiation field guiding optics to be designed as multiply recollimating, so that a plurality of collimated emerging branches can in turn be converted into a collimated incident branch.

During the formation of the incident branches and of the emerging branches, it is particularly favorable in terms of the formation of the amplifier radiation field for an intermediate-focused branch to be formed between the collimated emerging branch and the collimated incident branch by the radiation field guiding optics during each recollimation, that is to say when converting a collimated emerging branch into a collimated incident branch. This makes it possible to preserve the optical beam cross section in a particularly favorable way.

In terms of the interaction of the recollimation with the deviating unit, no detailed indications have been given so far. For instance, a particularly advantageous solution provides for the intermediate-focused branch required during the recollimation to pass respectively through a deviating unit according to the invention.

In principle, it would be conceivable to provide separate recollimating optics of the radiation field guiding optics for each recollimation.

Expediently, provision is made in this case for the intermediate-focused branch to travel along an optical path which corresponds to two times the focal length of the recollimation.

In terms of the design of the various recollimating optics, it would be conceivable to carry out different recollimations with different focal lengths. It is particularly favorable for all the recollimating optics to have the same focal length.

It is particularly favorable for a plurality of recollimating optics to be combined to form a radiation field shaping element.

A radiation field shaping element according to the invention, which causes at least one recollimation, may be designed as an element through which the amplifier radiation field passes, for example a lens system or, in the simplest case, a single lens.

As an alternative to this, it is also conceivable, however, to design the radiation field shaping element as a reflecting element.

In the simplest case, the radiation field shaping elements designed as a reflecting element is designed as a concave mirror.

Such a beam shaping element must, according to the invention, have a focusing element and a collimating element for each recollimation, so that conversion of a collimated emerging branch into the intermediate-focused branch and then conversion of the intermediate-focused branch in turn into a collimated incident branch is possible.

A solution in which a plurality of focusing elements and a plurality of collimating elements are combined to form a radiation field shaping element is particularly favorable.

It is particularly favorable in this case for this one radiation field shaping element to form collimating and focusing elements with different regions.

A particularly favorable embodiment of a radiation field shaping element provides for the radiation field shaping element to be designed rotationally symmetrically with respect to a mid-axis running through the solid body.

Such a rotationally symmetric design provides either a lens system which is designed and arranged rotationally symmetrically with respect to the mid-axis or a mirror system designed and acting rotationally symmetrically with respect to the mid-axis.

Such a mirror system is, in the simplest case, designed in such a way that the collimating and focusing elements are regions of a concave mirror designed rotationally symmetrically with respect to the mid-axis.

Such a concave mirror may, for example, be a parabolic mirror. It is also conceivable, however, to design this concave mirror as a toric mirror.

In terms of the number of deviating units, no detailed indications have been given in connection with the explanation of the individual exemplary embodiments so far.

For instance, an advantageous exemplary embodiment provides for the radiation field guiding optics to comprise at least two deviating units, each of these deviating units forming, from an input branch of the amplifier radiation field which is formed from one of the emerging branches, an output branch with a trajectory locally separate therefrom, from which the corresponding incident branch is formed.

In principle, it would be conceivable to provide a separate deviating unit for each incident branch to be formed from an emerging branch.

A solution designed in a particularly favorable way provides, however, for at least one of the deviating units to form, from at least two input branches formed from branches emerging from the solid body, at least two output branches from which the corresponding branches entering the solid body are formed, so that the number of deviating units can advantageously be reduced to two.

Furthermore, it is particularly favorable for the radiation field guiding optics to comprise two deviating units, and for an output branch of each of the deviating units to lead to the formation of a branch which enters the solid body, from which in turn, after is has passed through the solid body, an emerging branch is produced, from which an input branch of the respective other deviating unit is formed.

Such a solution permits, in a particularly favorable way, the two deviating units to be joined together, so that a particularly compact optical solution is obtained.

Further advantageous radiation field guiding optics according to the invention provide for them to comprise a first and a second deviating unit, and for the two deviating units, respectively by deviating the amplifier radiation field relative to a single deviating symmetry plane assigned to the respective deviating unit, to convert at least three input branches, formed from at least three different emerging branches of the amplifier radiation field, into at least three output branches which have trajectories correspondingly locally separate from the input branches and from which at least three incident branches are produced.

A further advantageous embodiment of the radiation field guiding optics according to the invention provides for the radiation field guiding optics to have at least one deviating unit, and for the deviating unit to form, from at least one input branch, an output branch which is offset in relation to a mid-axis of the radiation field guiding optics by an angular spacing such that at least one further input branch lies in the angle range between this input branch and the output branch formed therefrom.

A further particularly favorable solution provides for the radiation field guiding optics to have a first deviating unit, which deviates the amplifier radiation field relative to a first deviating symmetry plane, and to have a second deviating unit, which deviates the amplifier radiation field relative to a second deviating symmetry plane, and for the deviating symmetry planes to run at an angle with respect to one another, which preferably corresponds to 360° divided by the sum of the incident and emerging branches arising during a pass of the amplifier radiation field through the radiation field guiding optics and the solid body.

The term "pass of the amplifier radiation field" is in this case intended to mean propagation of the amplifier radiation field through the radiation field guiding optics, during which the propagation direction is preserved.

In terms of the arrangement of the deviating symmetry plane relative to the mid-axis, no detailed indications have been given so far. A particularly favorable solution provides for the deviating symmetry plane to run parallel to the mid-axis.

It is particularly favorable for the deviating symmetry plane to run through the mid-axis.

In terms of the arrangement of the input branches and the output branches of the deviating units, no detailed indications have been given so far. For instance, it is particularly favorable for the input branches of the amplifier radiation field to have trajectories spatially separate from one another.

In this case, it is particularly favorable for the input branches of the amplifier radiation field to be arranged relative to one another at angular spacings around the mid-axis of the radiation field guiding optics.

It is furthermore advantageous for the output branches to have separate trajectories from one another.

It is likewise favorable in this case for the output branches to have separate trajectories from the input branches.

It is particularly expedient for the output branches to be arranged relative to one another and relative to the input branches at angular spacings around the mid-axis of the radiation field guiding optics.

It is particularly advantageous in this case for the input branches and output branches produced during a pass of the amplifier radiation field through the radiation field guiding optics to be arranged without overlap in the space around the mid-axis of the radiation field guiding optics.

It is even more advantageous for the input branches and output branches, as well as an incident branch of the amplifier radiation field, during a pass to be arranged without overlap in the space around the mid-axis of the radiation field guiding optics.

A particularly advantageous solution provides for the input branches and output branches to be respectively arranged in separate space segments around the mid-axis of the radiation field guiding optics, and to extend inside the space segments transversely with respect to their propagation direction.

Preferably, the space segments are arranged in such a way that they stretch over approximately the same angle range around the mid-axis.

Particularly advantageous space utilization is obtained when the space segments of the input branches and of the output branches, as well as the space segment of the incident branch, essentially enclose the mid-axis.

Further features and advantages of the solution according to the invention are the subject matter of the following description and the graphical representation of a few exemplary embodiments.

BRIEF DESCRIPTION OF THE DRAWINGS

FIG. 16 shows a section along the line 16—16 in FIG. 15;

DETAILED DESCRIPTION OF THE INVENTION

Figure 1:
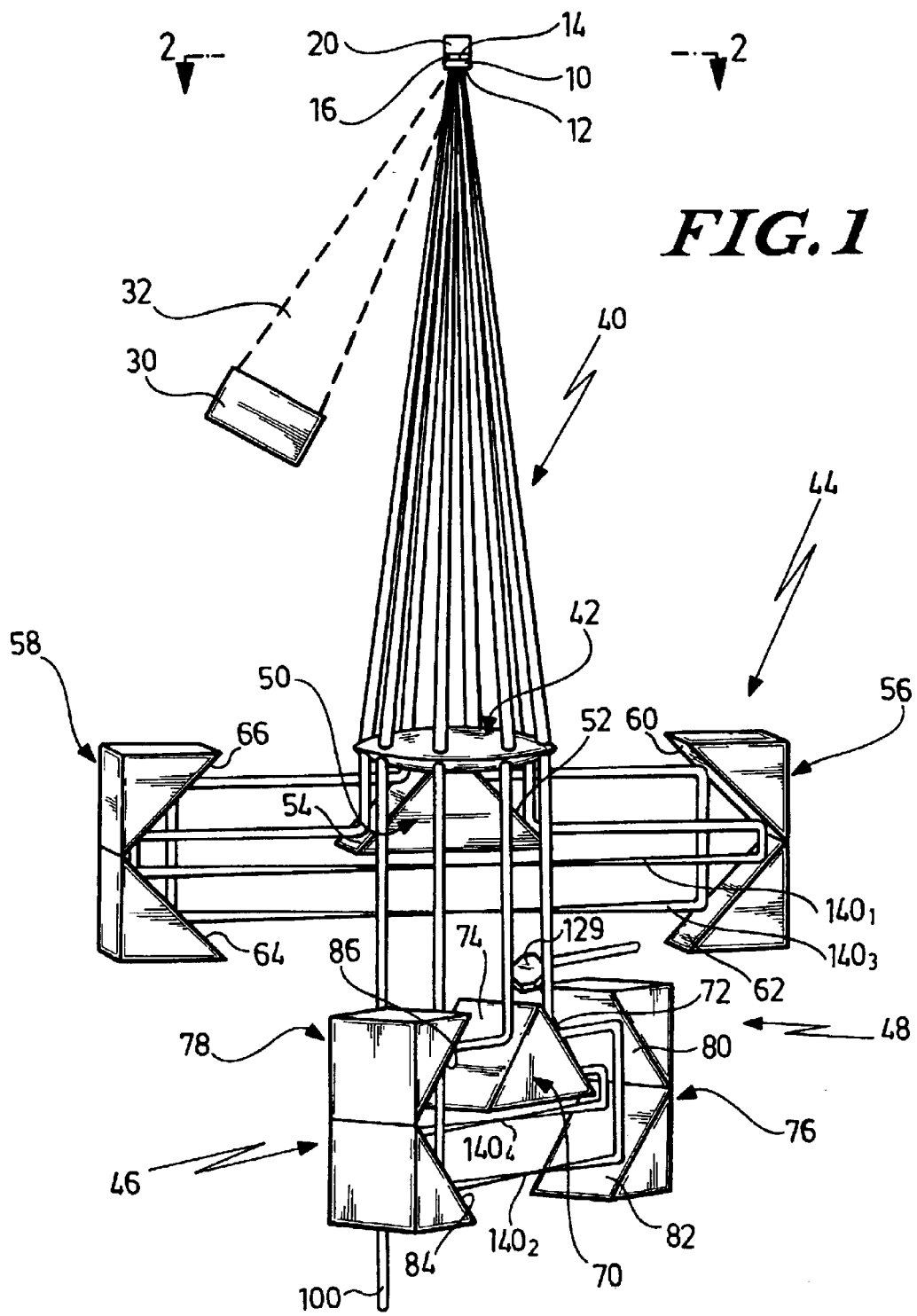
FIG. 1 shows a schematic representation of a first exemplary embodiment of the laser amplifier system according to the invention in perspective.
Figure 2:
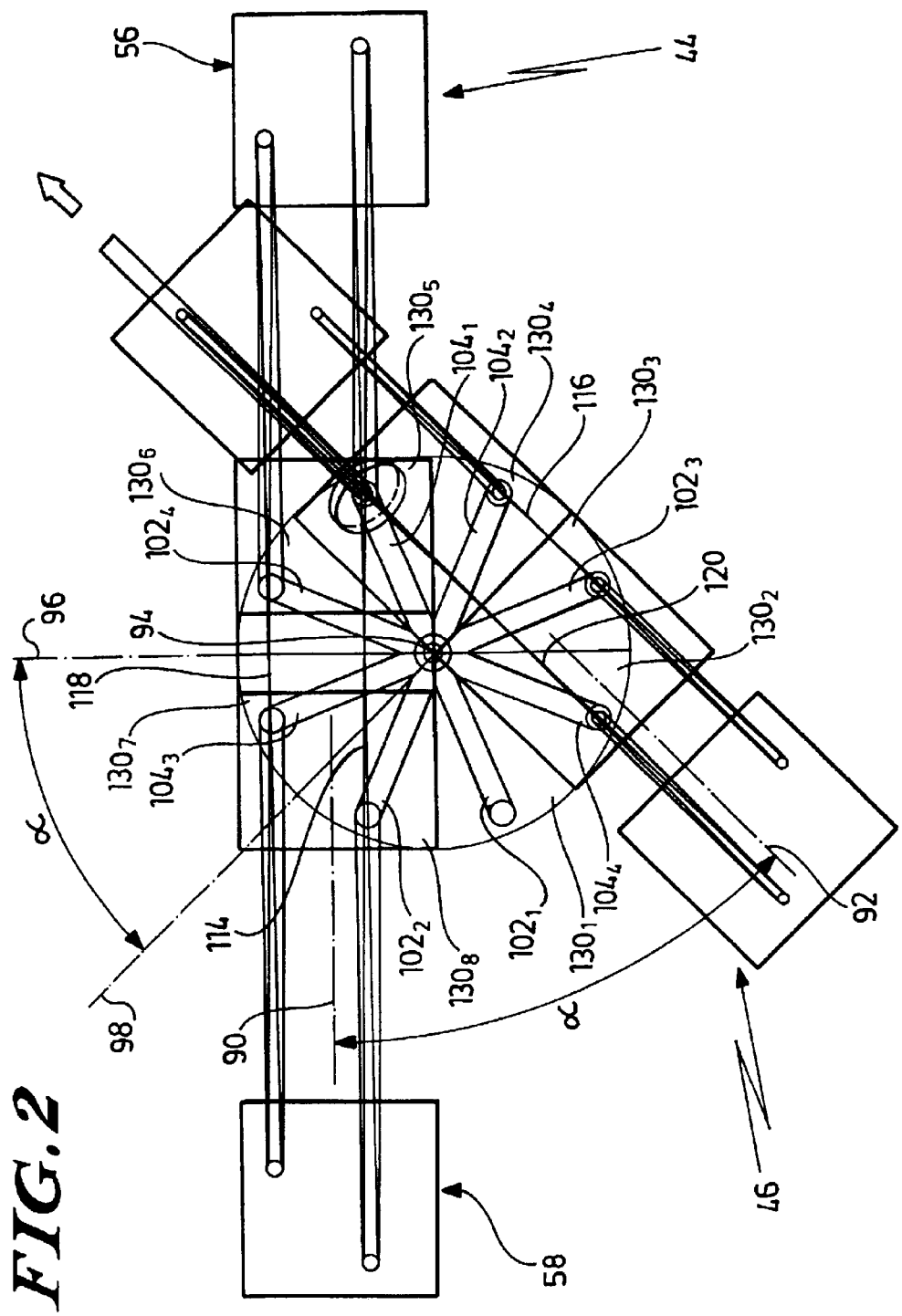
FIG. 2 shows a section along the line 2—2 in FIG. 1.

A first exemplary embodiment of a laser amplifier system according to the invention, represented overall in FIGS. 1 and 2, comprises a laser-active medium in the form of a solid body 10.

Such a laser-active medium is, for example, one such as described in EP 0 632 551.

The solid body 10 has a frontal flat side 12 and a rear flat side 14, and rests via the rear flat side 14 on a reflector, denoted as a whole by 16, which is for example a layer applied to the rear flat side 14.

Furthermore, cooling of the solid body 10 is carried out via the rear reflector 16 by means of a cooling device 20, the cooling device being, for example, a cold finger as likewise described in EP 0 632 551.

The two flat sides 12 and 14 of the solid body 10 need not necessarily be designed as planes, but may also, for example, have a curvature.

Pumping of the solid body 10 is carried out via a known pump device, for example likewise via a pump radiation field which may likewise be guided, for example, as in EP 0 632 551, although it is also conceivable to guide the pump radiation field, and make it enter the solid body 10, in accordance with the German Patent Application 198 35 107 or 198 35 108.

For this reason, a pump radiation source 30 is represented merely schematically, which produces a pump radiation field 32 that enters the solid body 10 and is preferably focused onto the solid body 10.

For optimum extraction of the coherent radiation produced by the laser-active medium, an amplifier radiation field, denoted as a whole by 40, is provided which comprises a radiation field shaping element 42 as well as a first deviating unit 44 and a second deviating unit 46.

The radiation field shaping element 42 as well as the deviating units 44 and 46 together form overall radiation field guiding optics, denoted as a whole by 48, which determine the formation of the amplifier radiation field 40.

The radiation field shaping element is, for example, an element which is capable of converting a collimated branch into a focused branch, or vice versa, that is to say focusing or collimating.

Such an exemplary embodiment of a radiation field shaping element 42 is, in the first exemplary embodiment, an element through which the radiation field passes, which may be formed by a lens or a lens system.

The first deviating unit 44 comprises an inner deviating prism 50 with a first reflecting face 52 and a second reflecting face 54, which run in a wedge-shaped fashion with respect to one another and point away from one another, that is to say they face away from one another. The first deviating unit 44 furthermore comprises two outer deviating prisms 56 and 58, which respectively have reflecting faces 60 and 62; 64 and 66 that run in a V-shape with respect to one another and face toward one another.

Preferably, the reflecting faces 60 and 66 run parallel to the reflecting faces 52 and 54 of the inner deviating prism 50, and are arranged facing toward them so that the scattering reflected by one reflector face respectively strikes the reflector face opposite it.

The reflector faces 62 and 64 are furthermore arranged at an angle of 90° relative to the reflector faces 60 and 66, respectively, and therefore also at an angle of 90° with respect to one another. In this case, by the reflector faces 62 and 64, the radiation is respectively reflected by one of these reflector faces to the other, so long as this radiation comes from the allocated reflector face 62 or 66, respectively.

Similarly, the second deviating unit 46 comprises an inner deviating prism 70 with two reflector faces 72 and 74 running at an angle of 90° with respect to one another and facing away from one another.

Furthermore, the second deviating unit 46 comprises two outer deviating prisms 76 and 78 respectively with reflector faces 80 and 82; 84 and 86 that run in a V-shape with respect to one another and face toward one another, the reflector face 80 running parallel to the reflector face 72 and the reflector face 86 running parallel to the reflector face 74, and the reflector faces respectively running parallel to one another facing toward one another.

Furthermore, the reflector faces 82 and 84 run at an angle of 90° with respect to the reflector faces 80 and 86, and furthermore at an angle of 90° relative to one another, and they are likewise oriented in such a way that one of the reflector faces 82, 84 reflects radiation to the other reflector face 84, 82, so long as this radiation comes from the corresponding reflector face 80 or 86, respectively, of the associated outer deviating unit 76 or 78.

Overall, all the reflector faces 52, 54, 60, 62, 64, 66 of the first deviating unit 44 run perpendicular to a longitudinal symmetry plane 90, and all the reflector faces 72, 74, 80, 82, 84, 86 of the second deviating unit 46 run perpendicular to a longitudinal symmetry plane 92 that meets the first symmetry plane 90 at an angle α which depends, as will be explained in detail later, on the number of collimated branches of the amplifier radiation field 40 and is equal to 360° divided by the number of collimated branches.

Furthermore, the longitudinal symmetry planes 90 and 92 run at a spacing from a mid-axis 94, which intersects the solid body 10 and runs symmetrically with respect to the collimated branches of the amplifier radiation field 40.

The reflector faces 52 and 54 of the inner deviating prism 50 are in this case mirror-symmetric with respect to a first deviating symmetry plane 96 of the first deviating unit 44, and the reflector faces 72 and 74 are symmetric with respect to a second deviating symmetry plane 98 of the second deviating unit 46, these deviating symmetry planes 96 and 98 running through the mid-axis 94 and intersecting in it. In this case, the deviating symmetry planes 96 and 98 likewise meet at the angle α.

Furthermore, the reflector faces 60 and 66 as well as 62 and 64 of the outer deviating prisms 56 and 58 are arranged symmetrically with respect to the first deviating symmetry plane 96, so that all these reflector faces run at an angle of 45° with respect to the first deviating symmetry plane 96.

Similarly, the reflector faces 80 and 86 as well as 82 and 84 of the outer deviating prisms 76 and 78 of the second deviating unit 46 are arranged symmetrically with respect to the second deviating symmetry plane 98 and therefore likewise all run at an angle of 45° with respect to it.

The construction of the amplifier radiation field 40 with the radiation field guiding optics 48 according to the invention is now represented in detail in FIGS. 3 to 10.

Figure 3:
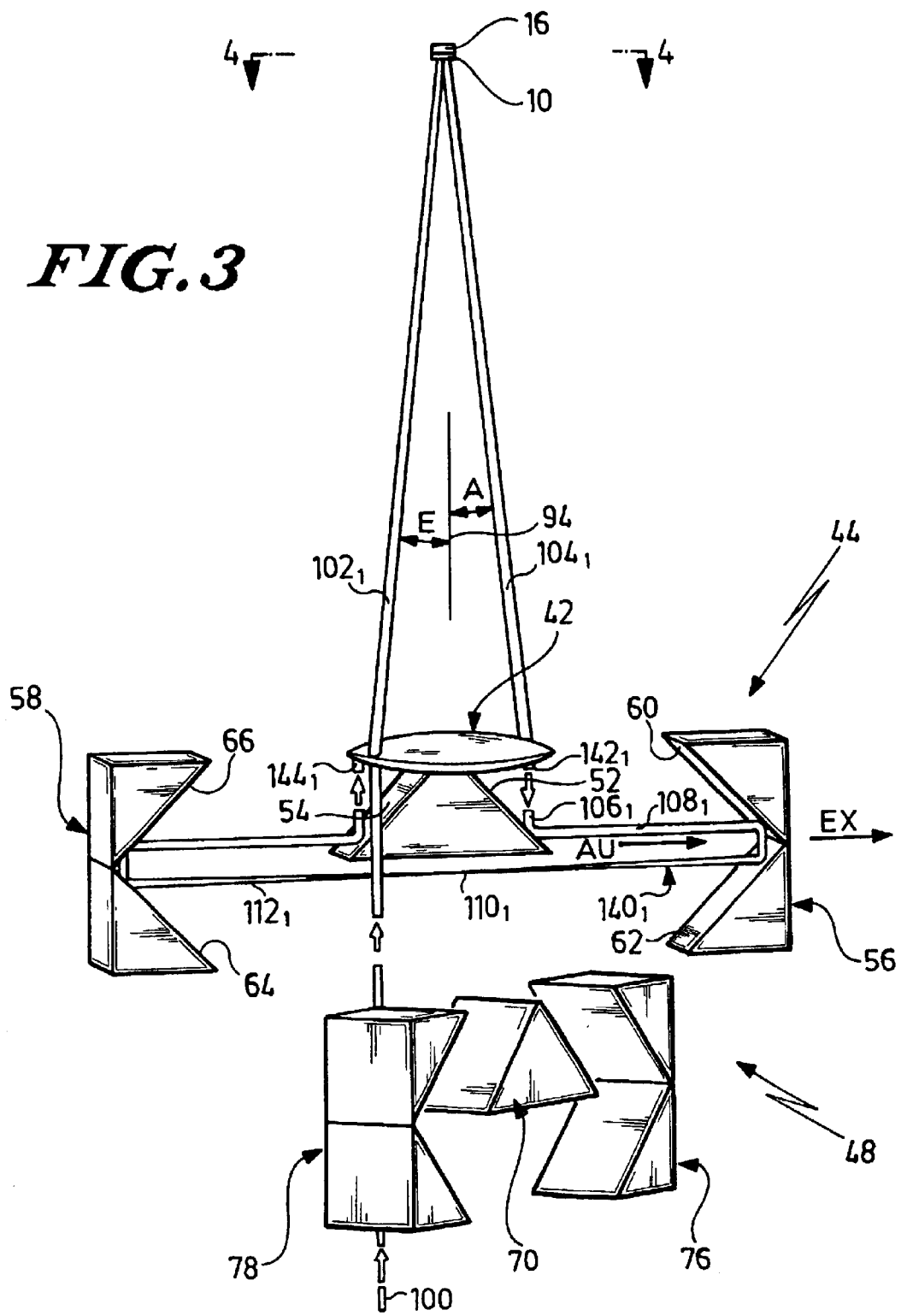
FIG. 3 shows a representation of the laser amplifier system according to the invention according to FIG. 1, a first incident branch, a first emerging branch and a first intermediate-focused branch being represented of the amplifier radiation field.

The starting point for the formation of the amplifier radiation field 40 is a divergent branch 100, which preferably runs parallel to the mid-axis 94 and is converted, by the radiation field shaping element 42, into a first collimated incident branch $102_1$ which enters the solid body 10, specifically at an angle E with respect to the mid-axis 94 (FIG. 3).

After it has passed through the solid body 10, a reflection takes place at the reflector 16, so that a first collimated branch $104_1$ emerging from the solid body 10 is produced, which runs at the angle A with respect to the mid-axis 94, the angle A corresponding to the angle E.

This first collimated emerging branch $104_1$ strikes the radiation field shaping element 42 and is converted by it into a first intermediate-focused branch $106_1$, which comprises a focused sub-branch $108_1$ that, for its part, forms a so-called first input branch $142_1$ by a section running parallel to the mid-axis 94, and strikes the reflector face 52, is reflected by it perpendicular to the deviating symmetry plane 96 onto the reflector face 60, is reflected by the latter onto the reflector face 62 and in turn propagates perpendicular to the first deviating symmetry plane 96 in the direction of the reflector face 64 (FIG. 3).

Preferably, the radiation field shaping element 42 is in this case designed in such a way that an intermediate focus $110_1$ of the focused sub-branch $108_1$ of the intermediate-focused branch $106_1$ lies in the deviating symmetry plane 96, and therefore a first divergent sub-branch $112_1$ propagates out from the focus $110_1$ starting from the deviating symmetry plane 96, specifically perpendicular to it, strikes the reflector face 64 and is reflected by it to the reflector face 66 and is then in turn reflected by the latter to the reflector face 54, which deviates this divergent sub-branch $112_1$ of the first intermediate-focused branch $106_1$ to the radiation field shaping element 42, specifically in such a way that it forms a section oriented parallel to the mid-axis 94, which represents a so-called first output branch 144 and with it strikes the radiation field shaping element 42.

Figure 4:
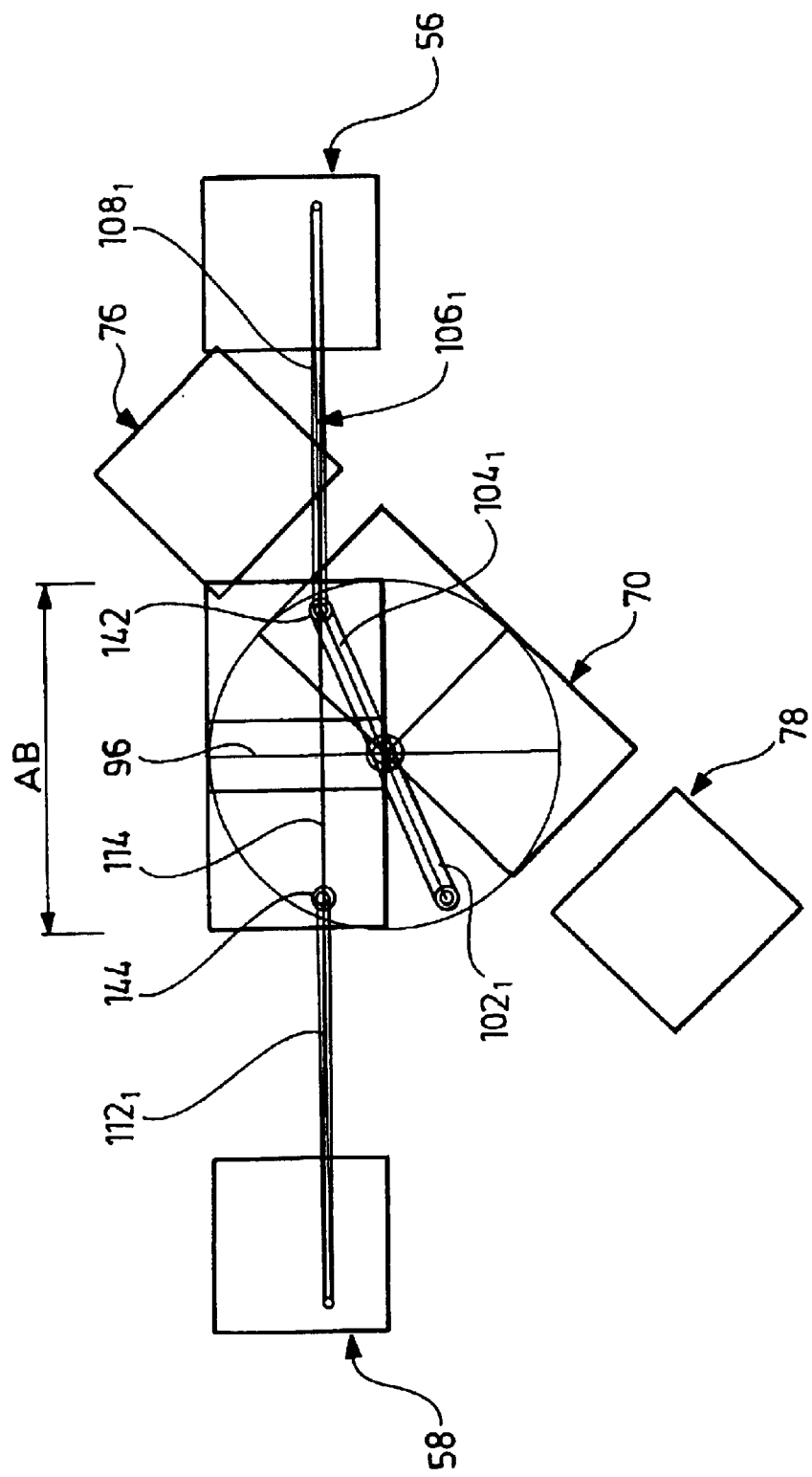
FIG. 4 shows a section along the line 4—4 in FIG. 3.

Overall, the intermediate-focused branch $106_1$ runs in a plane 114 parallel to, but at a spacing from, the longitudinal symmetry plane 90 and symmetrically with respect to the deviating symmetry plane 96 through the first deviating unit 44 (FIG. 4).

Figure 5:
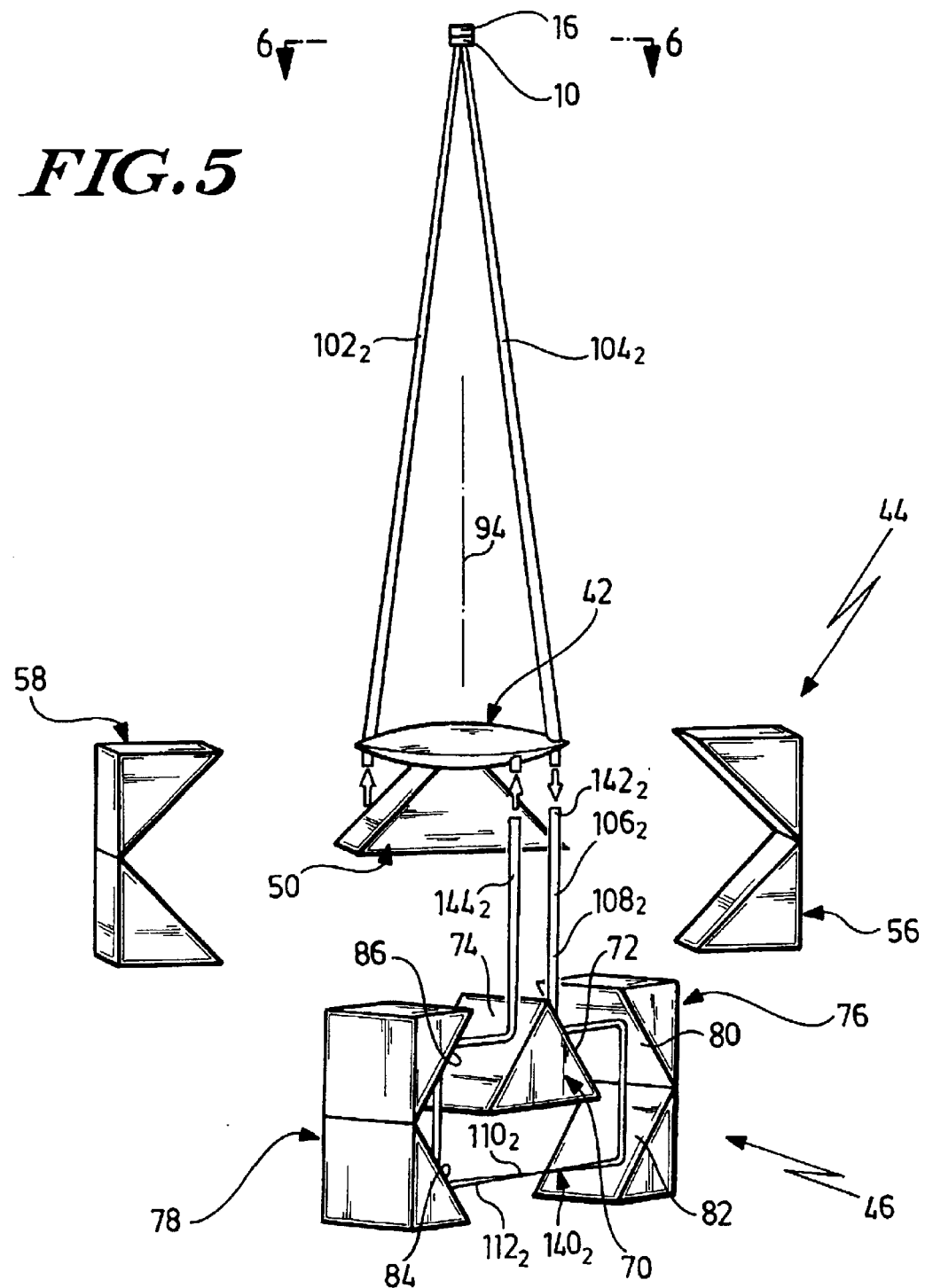
FIG. 5 shows a representation of the laser amplifier system according to the invention according to FIG. 1, a second incident branch, a second emerging branch and a second intermediate-focused branch being represented of the amplifier radiation field.

The radiation field shaping element 42 then forms, from the first intermediate-focused branch $106_1$, a second collimated incident branch $102_2$ which strikes the solid body 10 and passes through it, so that a second collimated emerging branch $104_2$ is formed by the reflector 16 (FIG. 5).

This collimated emerging branch $104_2$ strikes the radiation field shaping element 42 and is converted by it into a second intermediate-focused branch $106_2$ which, with its second input branch $142_2$, runs parallel to the mid-axis 94 and in this case strikes the reflection face 72 as a focused sub-branch $108_2$, which is reflected by the reflection face 72, by the reflection face 80 and by the reflection face 82, and forms an intermediate focus $110_2$ which lies in the deviating symmetry plane 98 of the second deviating unit 46. Starting from the intermediate focus $110_2$, the intermediate-focused branch $106_2$ propagates as a divergent sub-branch $112_2$ in the direction of the reflection face 84, is reflected by it to the reflection face 86 and then by the latter to the reflection face 74, so that the divergent sub-branch $112_2$ in turn strikes the beam shaping element 42 as a second output branch $144_2$ parallel to the mid-axis 94.

Figure 6:
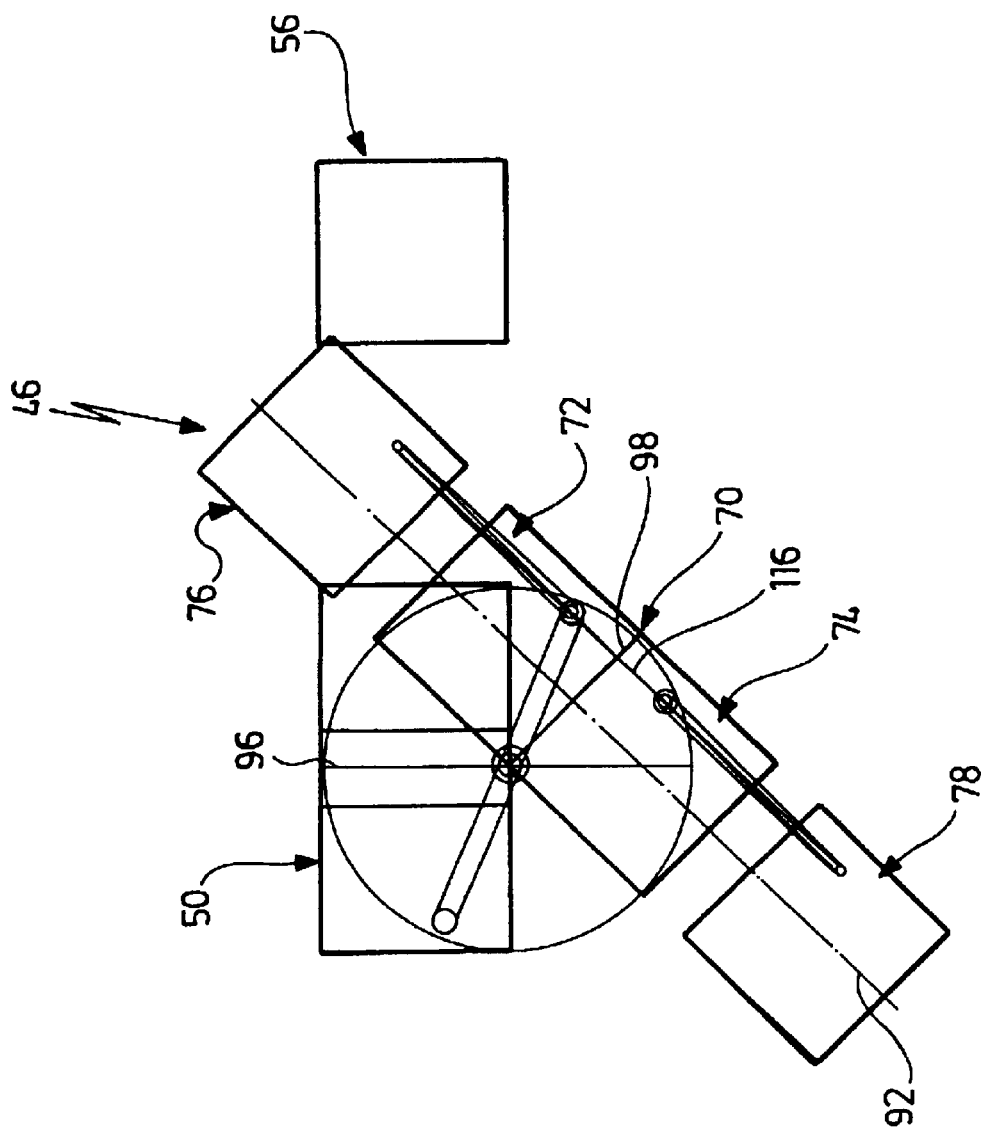
FIG. 6 shows a section along the line 6—6 in FIG. 5.

In this case, the second intermediate-focused branch runs overall in a plane 116, which is parallel to but at a spacing from the longitudinal symmetry plane 92, through the second deviating unit 46 and is furthermore symmetric with respect to the deviating symmetry plane 98 (FIG. 6).

Figure 7:
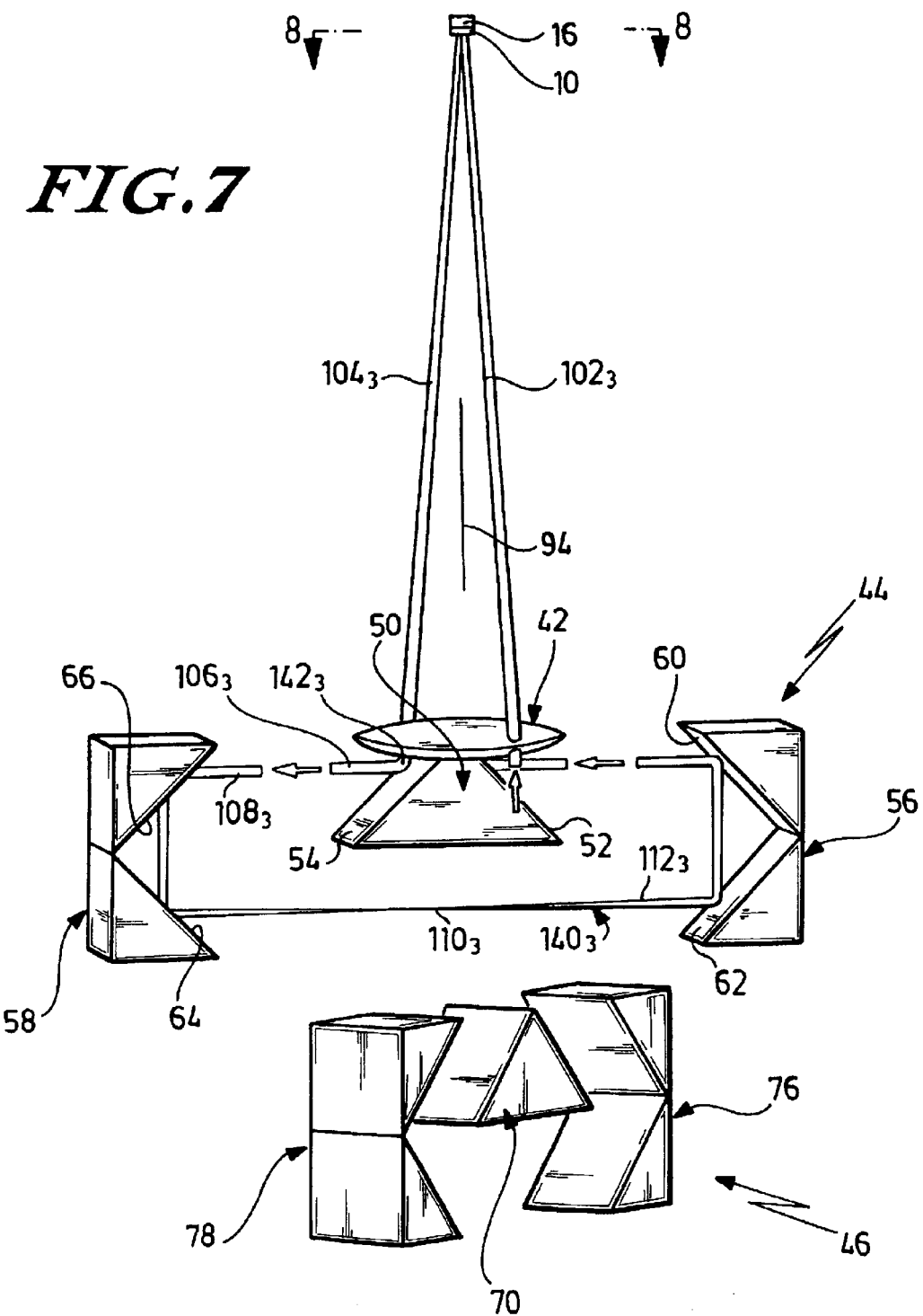
FIG. 7 shows a representation of the laser amplifier system according to FIG. 1, a third incident branch, a third emerging branch and a third intermediate-focused branch being represented of the amplifier radiation field.

From this second output branch $144_2$, the radiation field shaping element 42 in turn forms a third collimated incident branch $102_3$, which enters the solid body 10 and from which, by reflection at the reflector 16, the third collimated emerging branch $104_3$ is formed which in turn strikes the radiation field shaping element 42. The radiation field shaping element 42 forms, from the third collimated emerging branch $104_3$, a third intermediate-focused branch $106_3$ which, as a third input branch $142_3$ and as a focused sub-branch $108_3$, strikes the reflector face 54, is reflected by it to the reflector face 66 and by the reflector face 66 to the reflector face 64, and propagates as far as an intermediate focus $110_3$ which in turn lies in the deviating symmetry plane 96, as represented in FIG. 7.

Starting from the intermediate focus $110_3$, a divergent sub-branch $110_3$ then propagates in the direction of the reflector face 62, and from the latter in the direction of the reflector face 60, and it then strikes the reflector face 52 and is in turn reflected by the latter parallel to the mid-axis 94 and forms the third output branch $144_3$.

Figure 8:
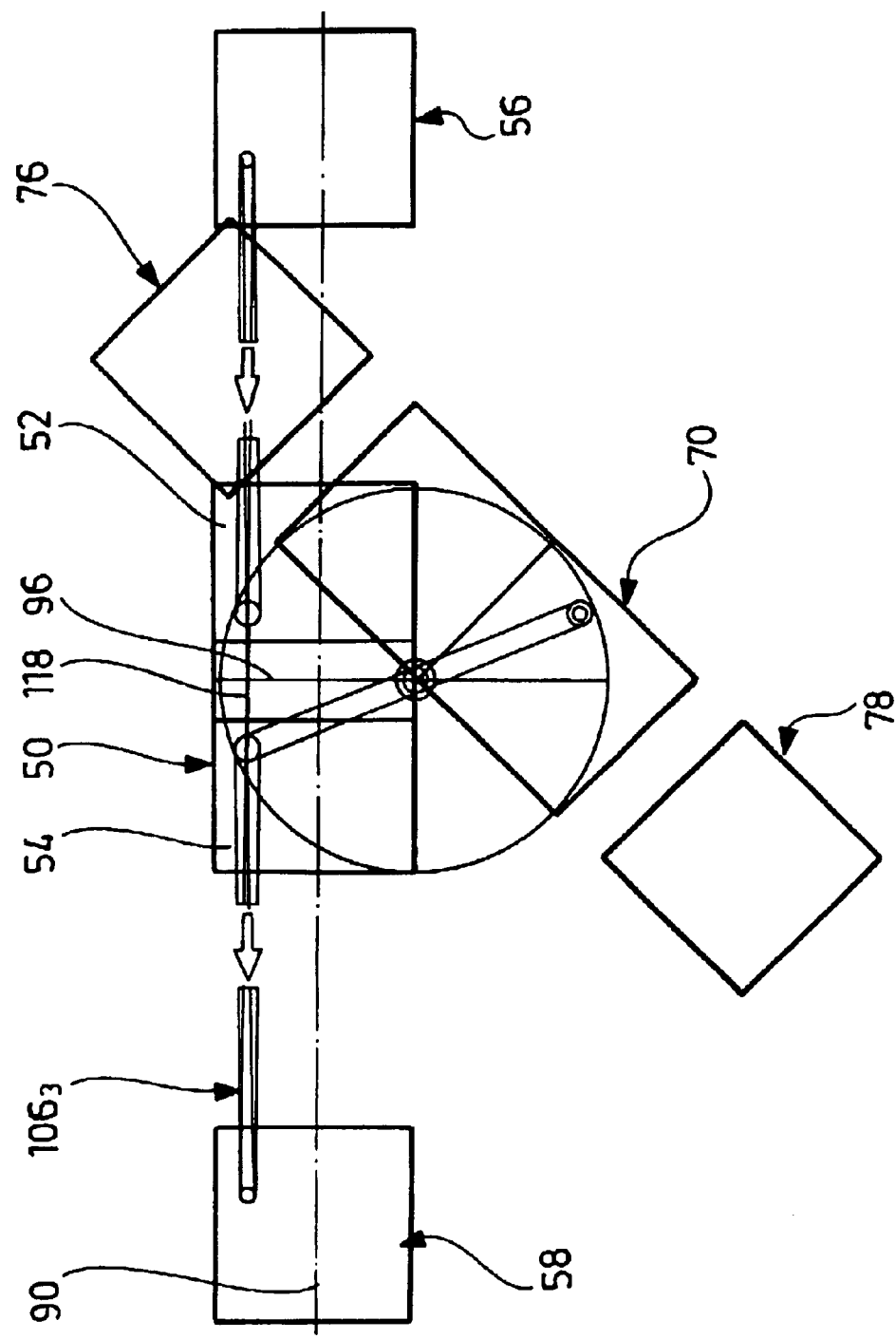
FIG. 8 shows a section along the line 8—8 in FIG. 7.

The third intermediate-focused branch $106_3$ also runs in a plane 118, which is parallel to but at a spacing from the longitudinal symmetry plane 90, and therefore also parallel to the plane 114, although it is not congruent with the plane 114 (FIG. 8).

Furthermore, the third intermediate-focused branch $106_3$ likewise runs symmetrically with respect to the deviating symmetry plane 96.

Preferably, the planes 114 and 118 are symmetric with respect to the longitudinal symmetry plane 90.

Figure 9:
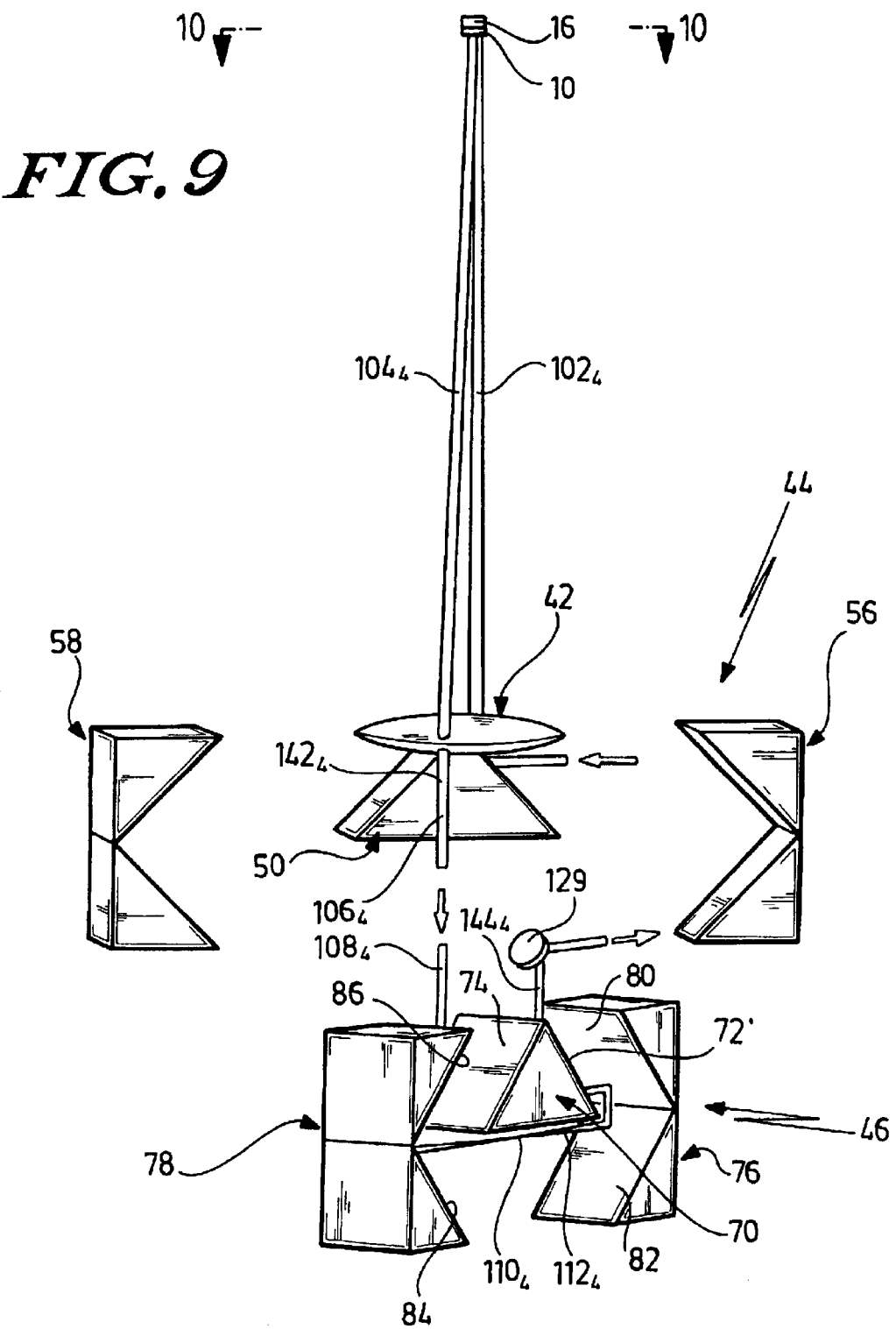
FIG. 9 shows a representation of the laser amplifier system according to FIG. 1, a fourth incident branch, a fourth emerging branch and a fourth intermediate-focused branch being represented of the amplifier radiation field.
Figure 10:
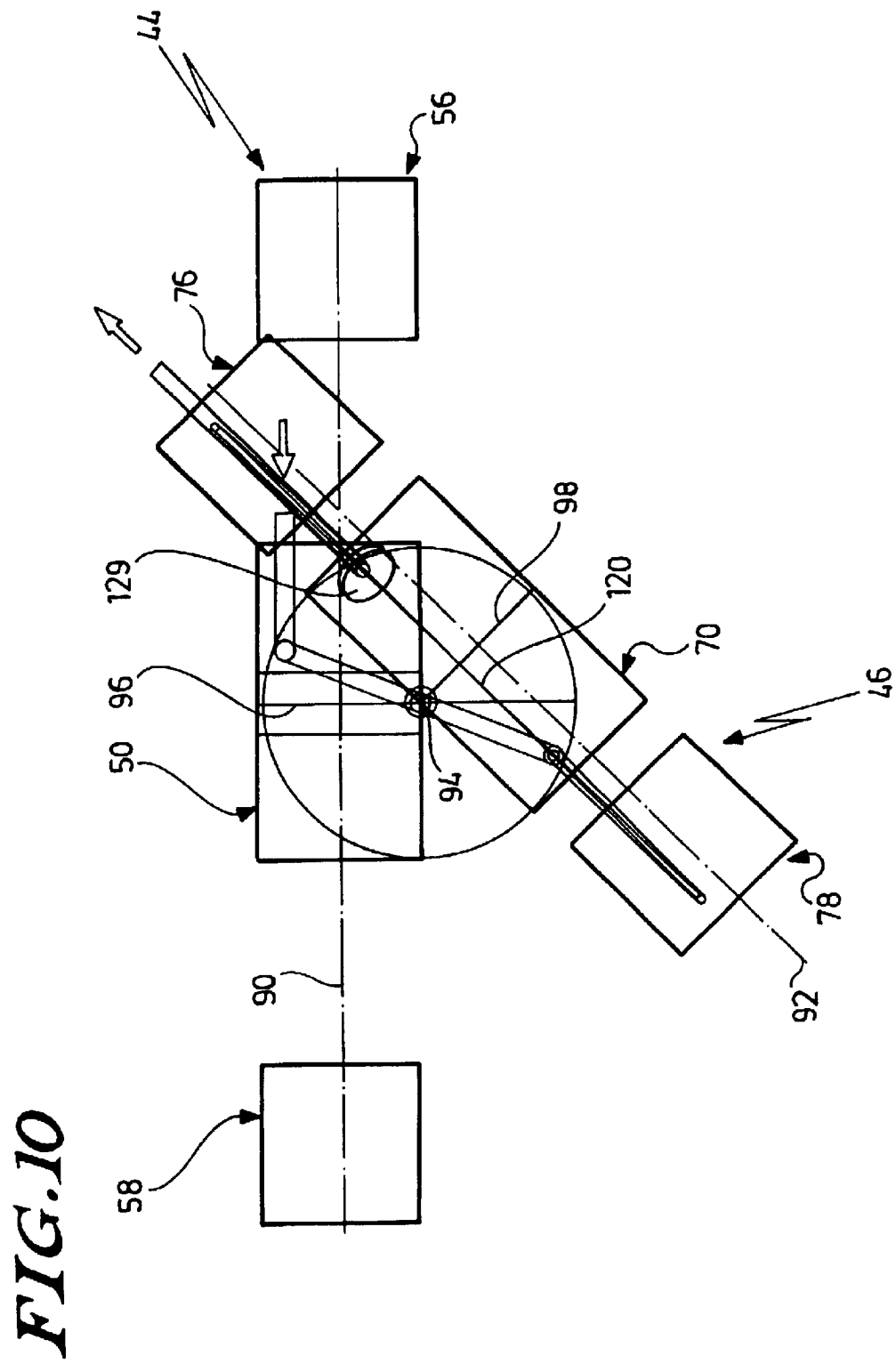
FIG. 10 shows a section along the line 10—10 in FIG. 9.

From the third intermediate-focused branch $106_3$, the radiation field shaping element 42 forms, as represented in FIG. 9, the fourth collimated incident branch $102_4$ which enters the solid body 10 and from which, by the reflector 16, the fourth collimated emerging branch $104_4$ is formed which in turn strikes the radiation field shaping element 42 and from which the radiation field shaping element 42 forms a fourth intermediate-focused branch $106_4$ which, as represented in FIGS. 9 and 10, firstly strikes the reflector face 74 in the form of a focused sub-branch $108_4$, and is reflected by it to the reflector face 86 and then to the reflector face 84, with a focus $110_4$ in turn lying in the deviating symmetry plane 98.

Starting from the focus $110_4$, a divergent branch $112_4$ is formed which strikes the reflector face 82, the reflector face 80 and then the reflector face 72. Therefore, the fourth intermediate-focused branch $106_4$ likewise runs overall in a plane 120, which runs parallel to the longitudinal symmetry plane 92 and therefore also parallel to the plane 116, but does not coincide with the plane 116 (FIG. 10).

Preferably, the planes 116 and 120 are symmetric with respect to the longitudinal symmetry plane 92 (FIG. 2).

The fourth intermediate-focused branch $106_4$, starting from its fourth input branch $142_4$, likewise runs essentially symmetrically with respect to the deviating symmetry plane 98, although, departing from complete symmetry, not as far as the radiation field shaping element 42, but rather it strikes with the divergent sub-branch $112_4$, with its fourth output branch $144_4$ running parallel to the mid-axis 94, an extraction mirror 129 which deviates the divergent branch $112_4$ transversely with respect to the mid-axis 94 and makes it emerge from the radiation field guiding optics 48 as an extracted branch, as represented in FIGS. 9 and 10; this may also, for example, enter a further laser amplifier system as a divergent branch. Upon reaching the extraction mirror 129, a pass of the amplifier radiation field 40 through the radiation field guiding optics 48 is completed.

Overall, as represented in FIG. 2, all the collimated branches 102 and 104 of the amplifier radiation field 40 lie respectively in individual space segments $130_1$ to $130_8$ around the mid-axis 94, with all the space segments 130 stretching over the same angular spacing around the mid-axis 94.

Furthermore, the collimated branches propagating in the space segments $130_2$ to $130_4$ interact with the second deviating unit 46, while the collimated branches propagating in the space segments $130_5$ to $130_8$ interact with the first deviating unit 44.

Both the first deviating unit 44 and the second deviating unit 46 lead, in the case of each intermediate-focused branch 106, to the formation of a loop 140 whose input branch 142 and whose output branch 144 have a spacing AB, while the loop 140 has an extent AU in at least one expansion direction EX which is greater than the spacing AB, preferably equal to at least two times the spacing AB.

The effect achieved by this is that the mirror faces lying on either side of the respective intermediate focus 110 of the intermediate-focused branch 106, for example the mirror faces 62 and 64 or the mirror faces 82 and 84, have a mutual spacing corresponding roughly to the extent AU of the loop 140, the spacing preferably being equal to half of the extent AU, so that the reflection faces 62 and 64; 82 and 84 arranged closest to the respective focus 110 are placed as far as possible away from the focus, in order to obtain a beam cross section which is as large as possible, and therefore an intensity per unit area of the beam cross section which is as small as possible, on the respective reflector faces 62 and 64; 82 and 84, so that it is possible to avoid damage to the reflector faces 62 and 64; 82 and 84 due to excessive intensity per unit area of the beam cross section.

Furthermore, the deviating units 44 and 46 are designed in such a way that, starting from the radiation field shaping element 42, the optical path in each of the loops $140_1$ to $140_3$, which in turn respectively lead back to the radiation field shaping element 42, is of equal size so that, in the simplest case, the radiation field shaping element 42 can convert one of the collimated branches 102, 104 into one of the intermediate-focused branches 106, or vice versa, in all the space segments $130_1$ to $130_8$ with the same focal length.

If parasitic modes are intended to be avoided, then space filters, for example in the form of shutter diaphragms, will preferably be allocated to one or more intermediate foci 110.

Figure 11:
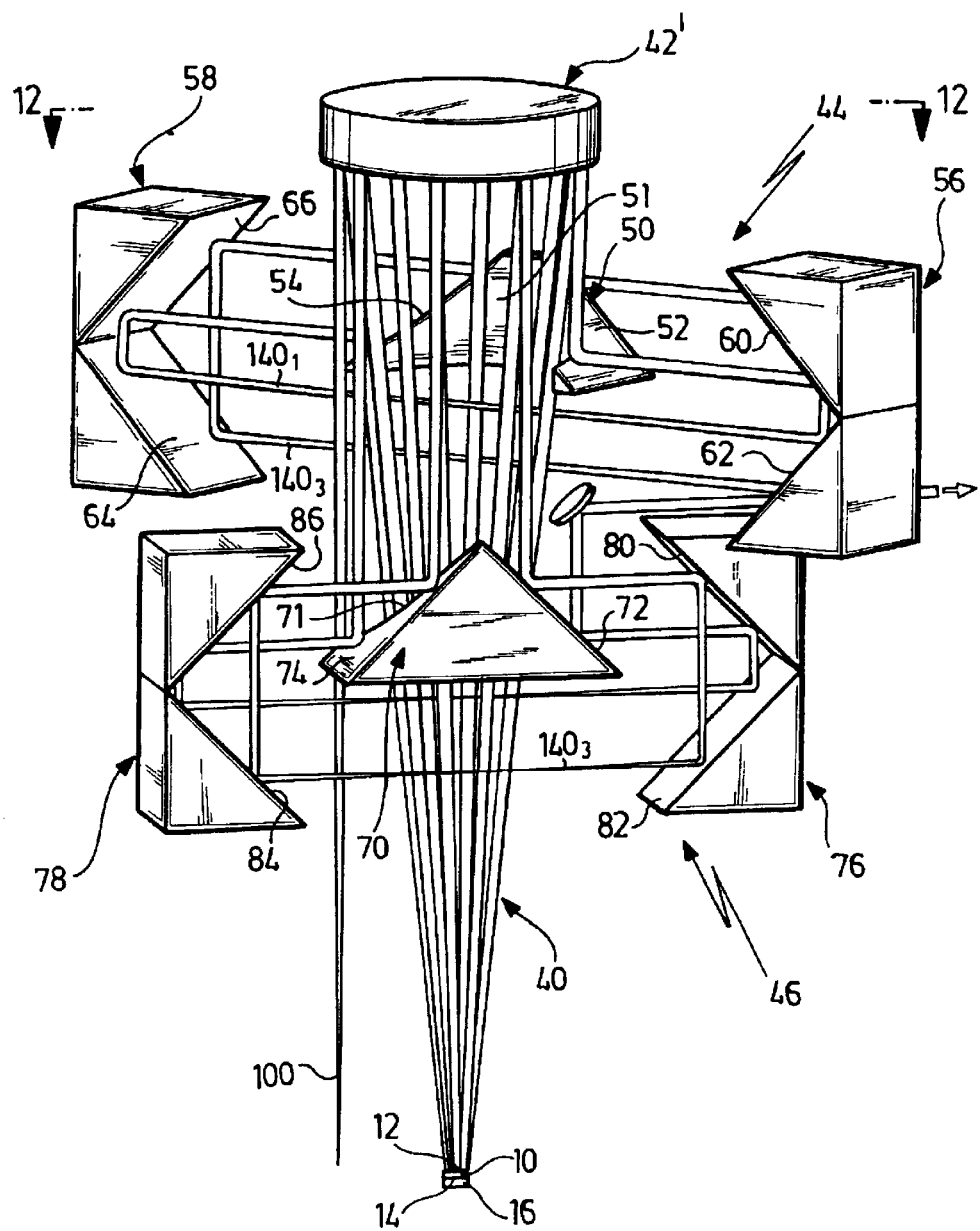
FIG. 11 shows a representation of a second exemplary embodiment of a laser amplifier system according to the invention similar to FIG. 1.
Figure 12:
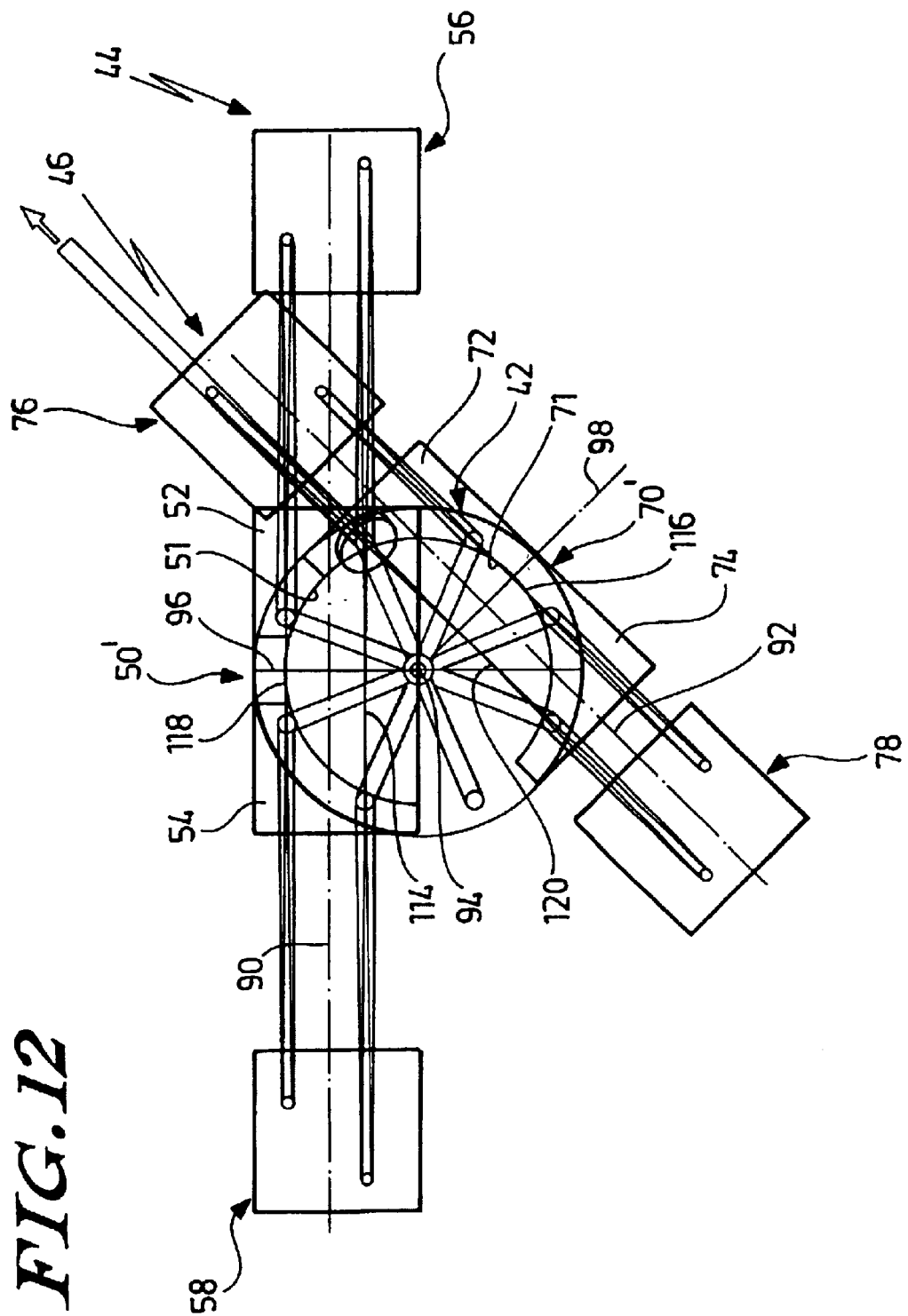
FIG. 12 shows a section along the line 12—12 in FIG. 11.
Figure 13:
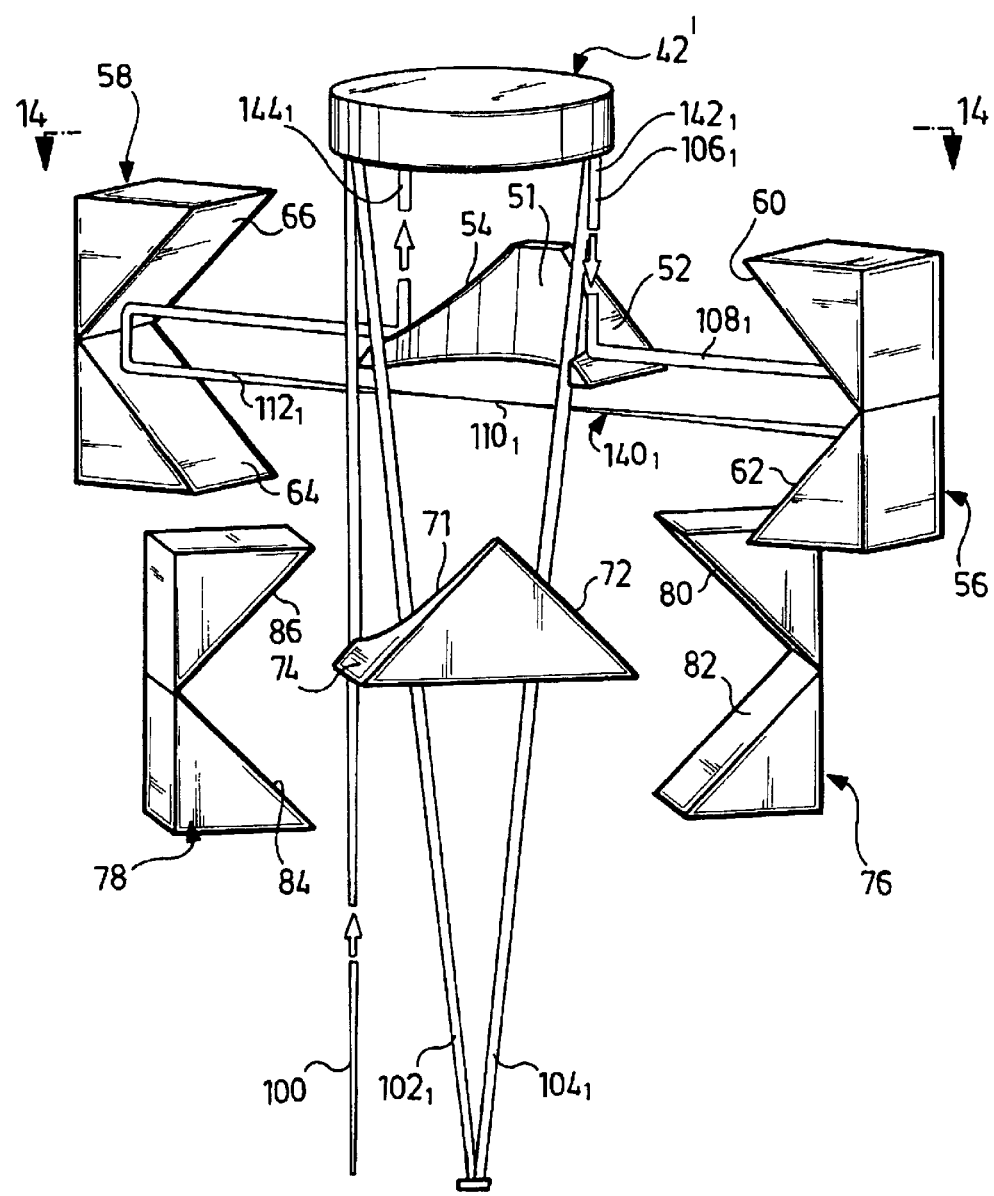
FIG. 13 shows a representation of the laser amplifier system according to FIG. 11, the first incident branch, the first emerging branch and the first intermediate-focused branch being represented of the amplifier radiation field.
Figure 14:
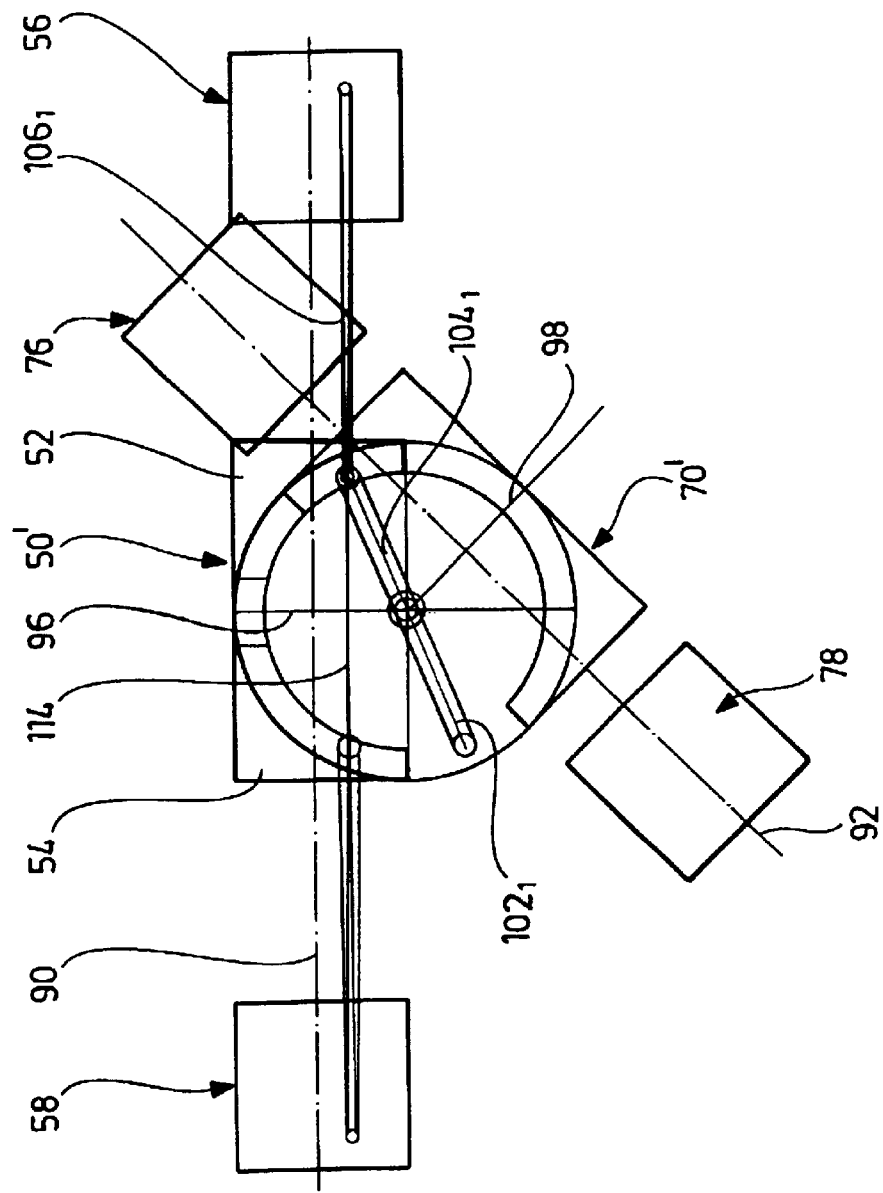
FIG. 14 shows a section along the line 14—14 in FIG. 13.
Figure 15:
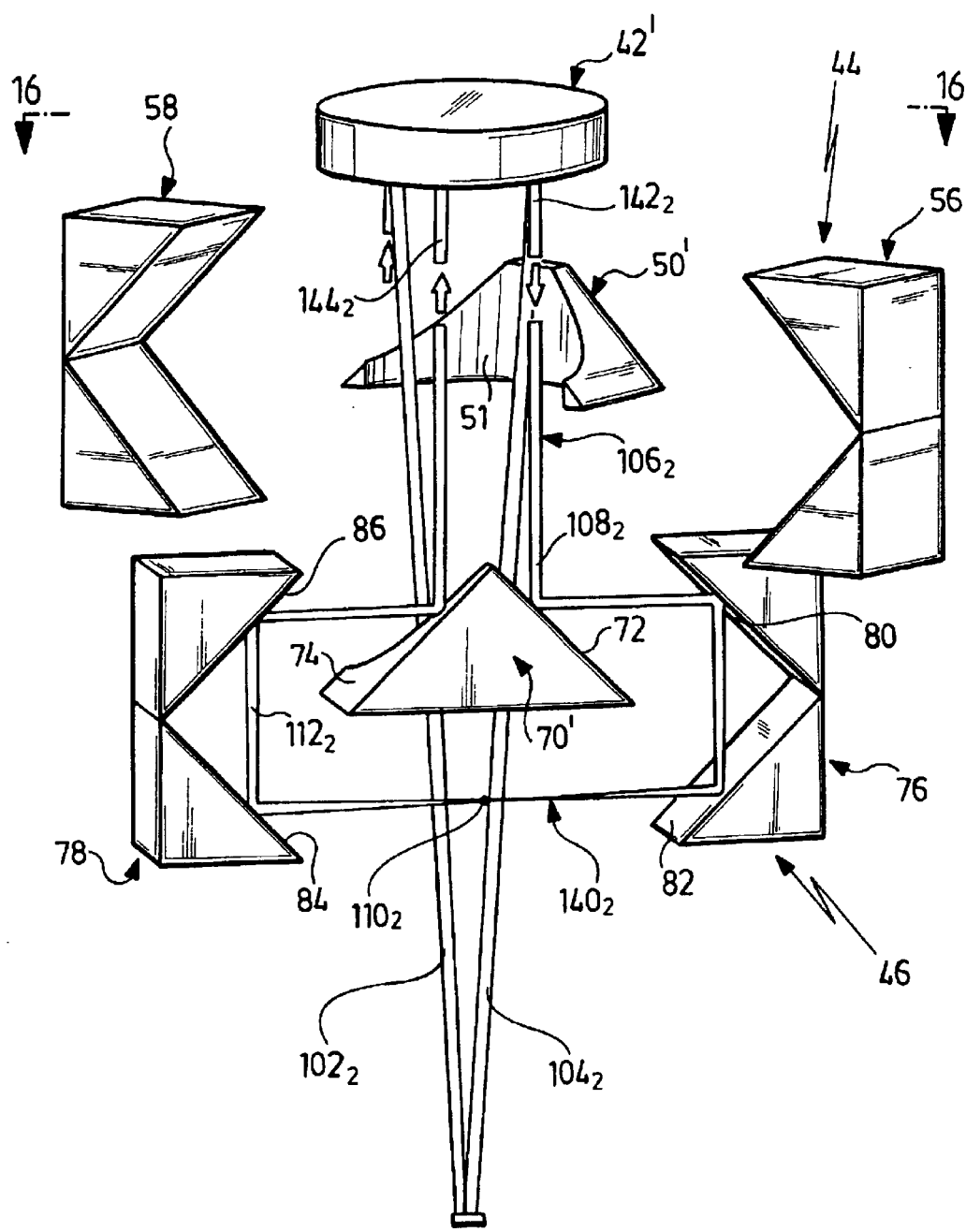
FIG. 15 shows a representation of the laser amplifier system according to FIG. 11, the second incident branch, the second emerging branch and the second intermediate-focused branch being represented of the amplifier radiation field.
Figure 17:
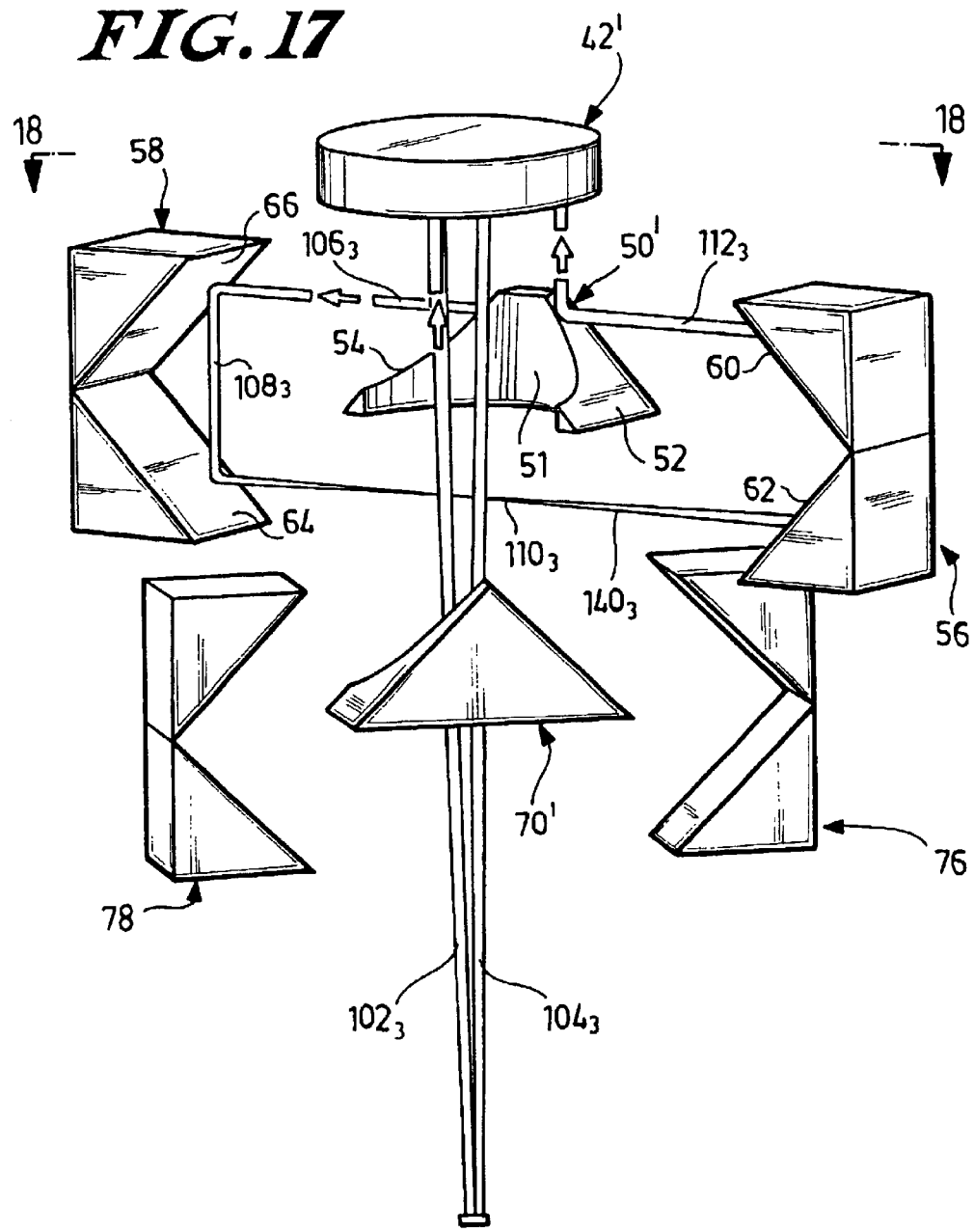
FIG. 17 shows a representation of the laser amplifier system according to FIG. 11, the third incident branch, the third emerging branch and the third intermediate-focused branch being represented of the amplifier radiation field.
Figure 18:
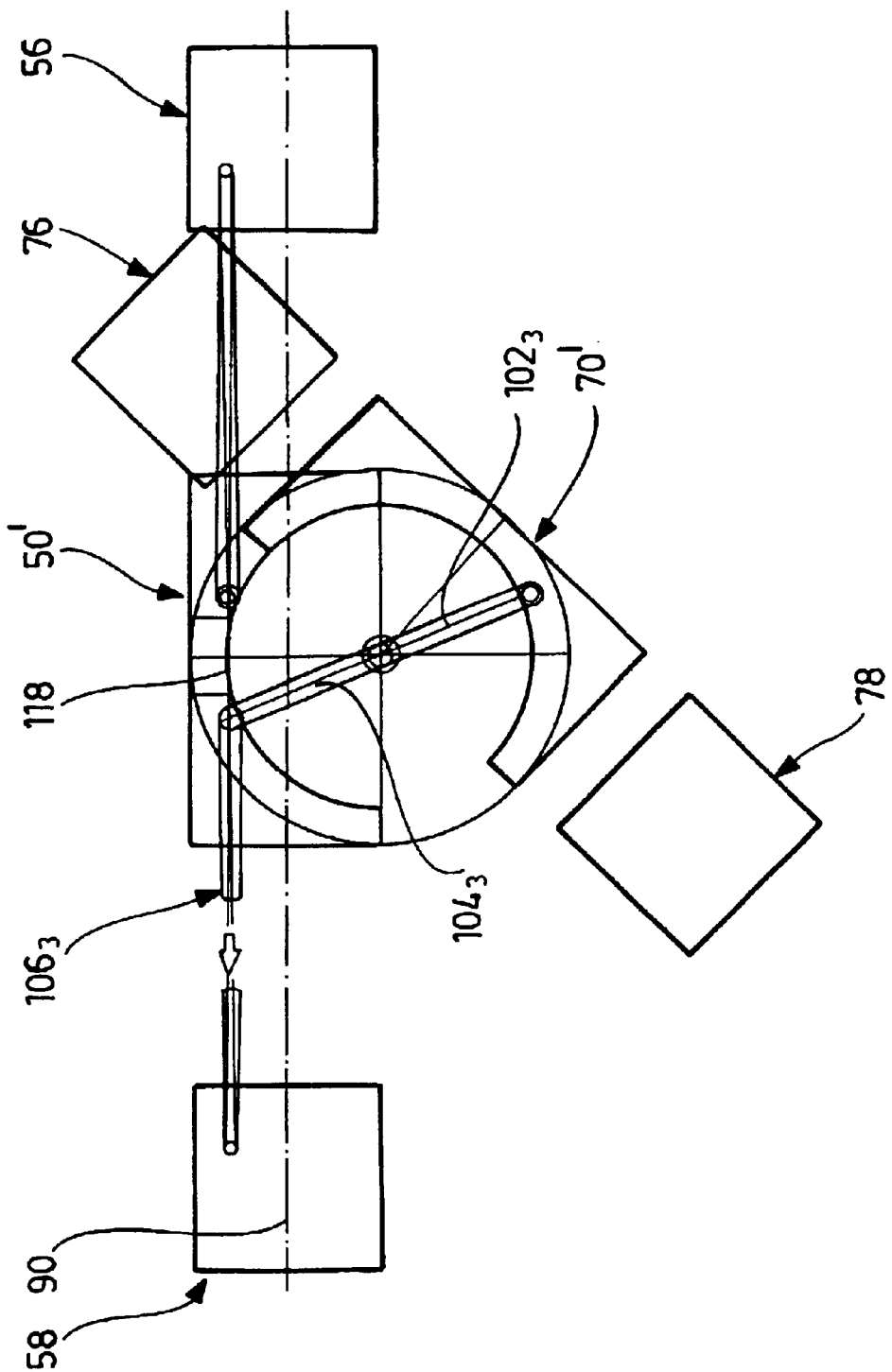
FIG. 18 shows a section along the line 18—18 in FIG. 17.
Figure 19:
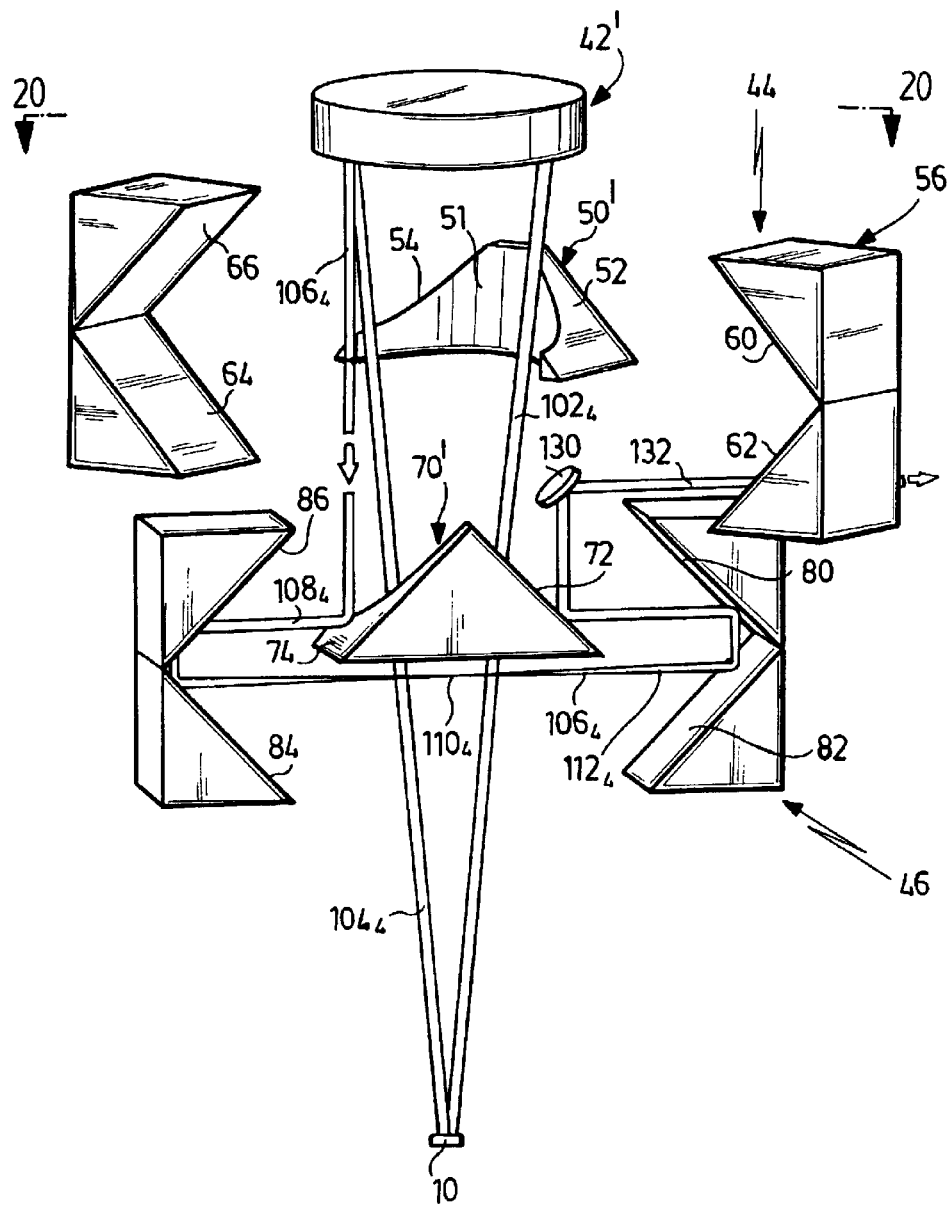
FIG. 19 shows a representation of the laser amplifier system according to FIG. 11, the fourth incident branch, the fourth emerging branch and the fourth intermediate-focused branch being represented of the amplifier radiation field.
Figure 20:
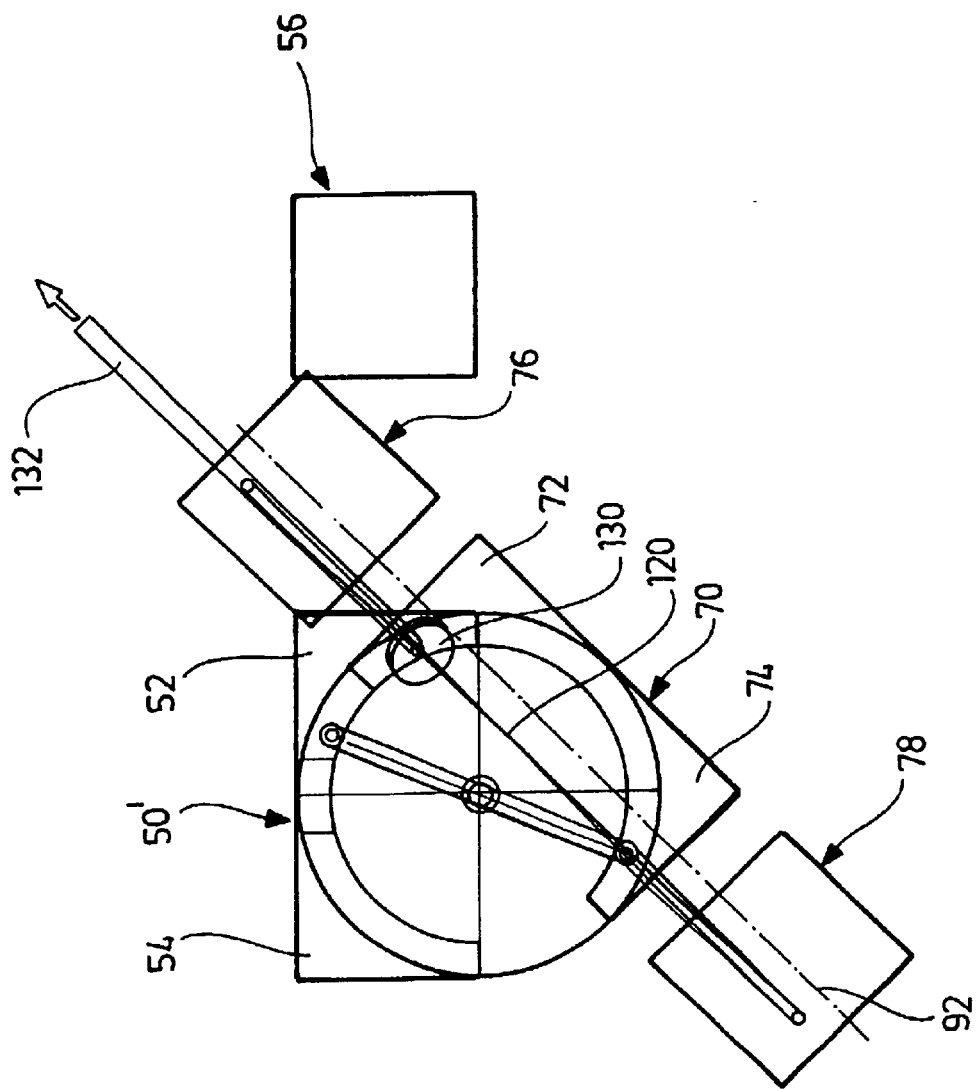
FIG. 20 shows a section along the line 20—20 in FIG. 19.

In a second exemplary embodiment of a laser amplifier system according to the invention, represented in FIGS. 11 and 12, those elements which are identical to the ones in the first exemplary embodiment are provided with the same reference numbers, so that comprehensive reference can be made to the comments relating to the first exemplary embodiment.

In particular, the deviating units 44 and 46 are arranged in the same way relative to the radiation field shaping element 42 as in the first exemplary embodiment.

In contrast to the first exemplary embodiment, the amplifier radiation field does not pass through the radiation field shaping element 42, but rather the radiation field shaping element 42 is designed as a reflecting element, for example as a concave mirror, which may have either parabolic reflection faces or toric reflection faces in cross section.

Therefore, the loops $140_1$ to $140_3$ passing through the deviating units lie on the same side of the radiation field shaping element 42 as the individual collimated branches 102 and 104.

The consequence of this is that the inner deviating prisms 50' and 70' are provided, in relation to the mid-axis 94, with a circular recess 51 and 71', respectively, which permit unimpeded through-passage of the collimated branches 102, 104, the recesses 51 and 71 furthermore being dimensioned in such a way that total reflection of the sections of the intermediate-focused branches 106 propagating parallel to the mid-axis 94 always takes place at the reflection faces 52 and 54; 72 and 74.

This means that the radius of the recesses 51 and 71 in relation to the mid-axis is smaller than the spacing, from the mid-axis 94, of the sections of the intermediate-focused branches 106 running parallel to the mid-axis 94.

In other regards, the construction of the amplifier radiation field 40 in the second exemplary embodiment takes place in the same way as in the first exemplary embodiment, as can be seen from FIGS. 13 to 20.

Figure 21:
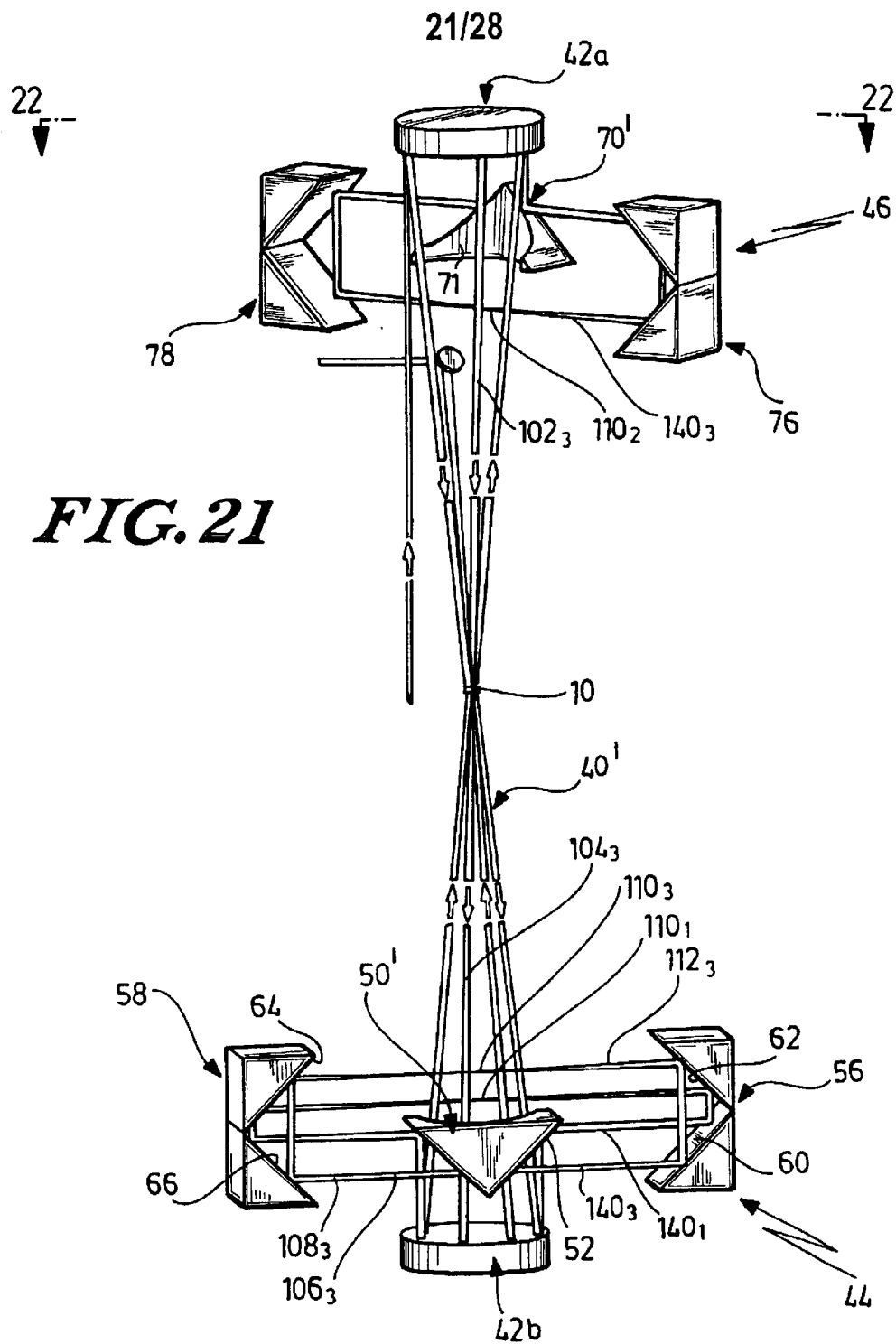
FIG. 21 shows a similar representation to FIG. 1 of a third exemplary embodiment of the laser amplifier system according to the invention.
Figure 22:
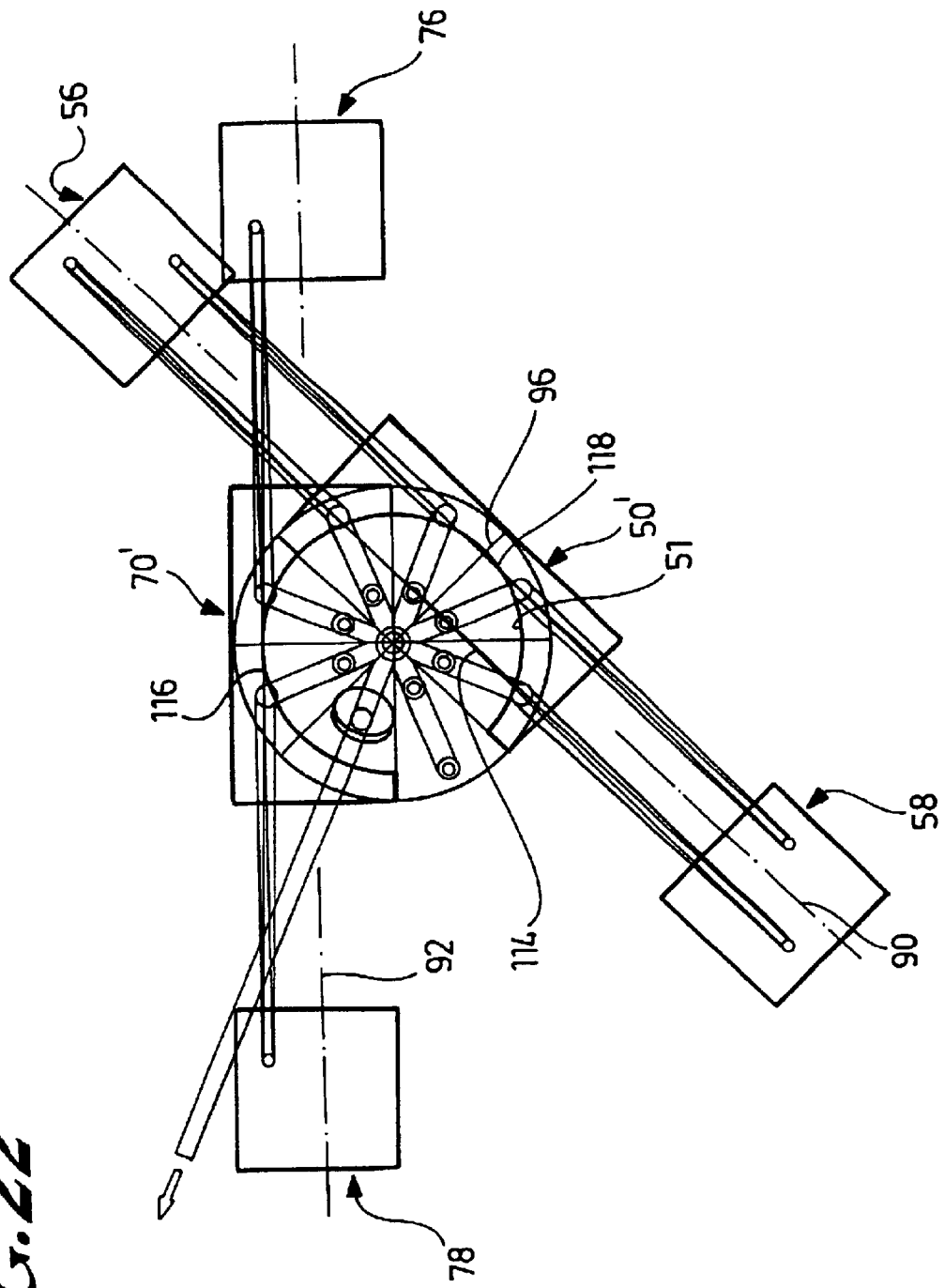
FIG. 22 shows a section along the line 22—22 in FIG. 21.

In a third exemplary embodiment of the laser amplifier system according to the invention, represented in FIGS. 21 and 22, the solid body 10 is not provided with a reflector, but rather it is arranged in the amplifier radiation field 40' in such a way that this can pass through the solid body 10.

Furthermore, in the through-radiation direction of the solid body 10, radiation field shaping elements 42a and 42b are arranged on either side thereof, each of which is capable of converting a collimated branch 102 or 104 into an intermediate-focused branch 106, and vice versa.

In the simplest case, the radiation field shaping elements 42a and 42b are designed as identical concave mirrors.

Furthermore, the first deviating unit 44 is arranged on one side of the solid body 10 and is used to expand those intermediate-focused branches 106 which are produced by the radiation field shaping element 42b, while the second deviating unit 46 is arranged on the opposite side of the solid body 10 and is used to expand the intermediate-focused branches 106 produced by the radiation field shaping element 42a.

In principle, however, the construction of the amplifier radiation field takes place in the same way as in the second exemplary embodiment, although with the difference that radiation respectively takes place through the solid body.

The construction of the amplifier radiation field 40' is represented in detail in FIGS. 23 to 28.

Figure 23:
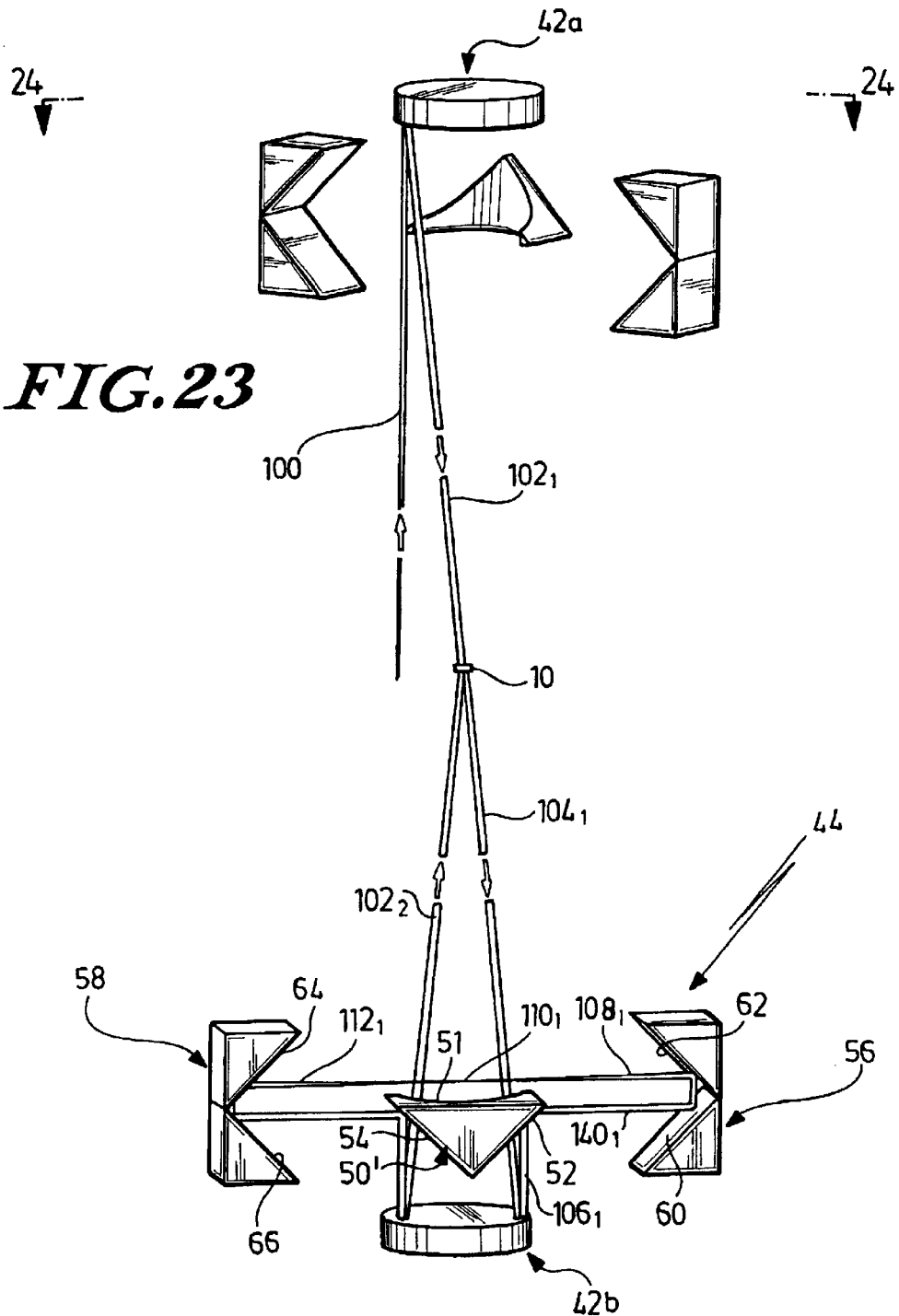
FIG. 23 shows a representation of the laser amplifier system corresponding to FIG. 21, the first incident branch, the first emerging branch, the first intermediate-focused branch and the second incident branch being represented of the amplifier radiation field.
Figure 24:
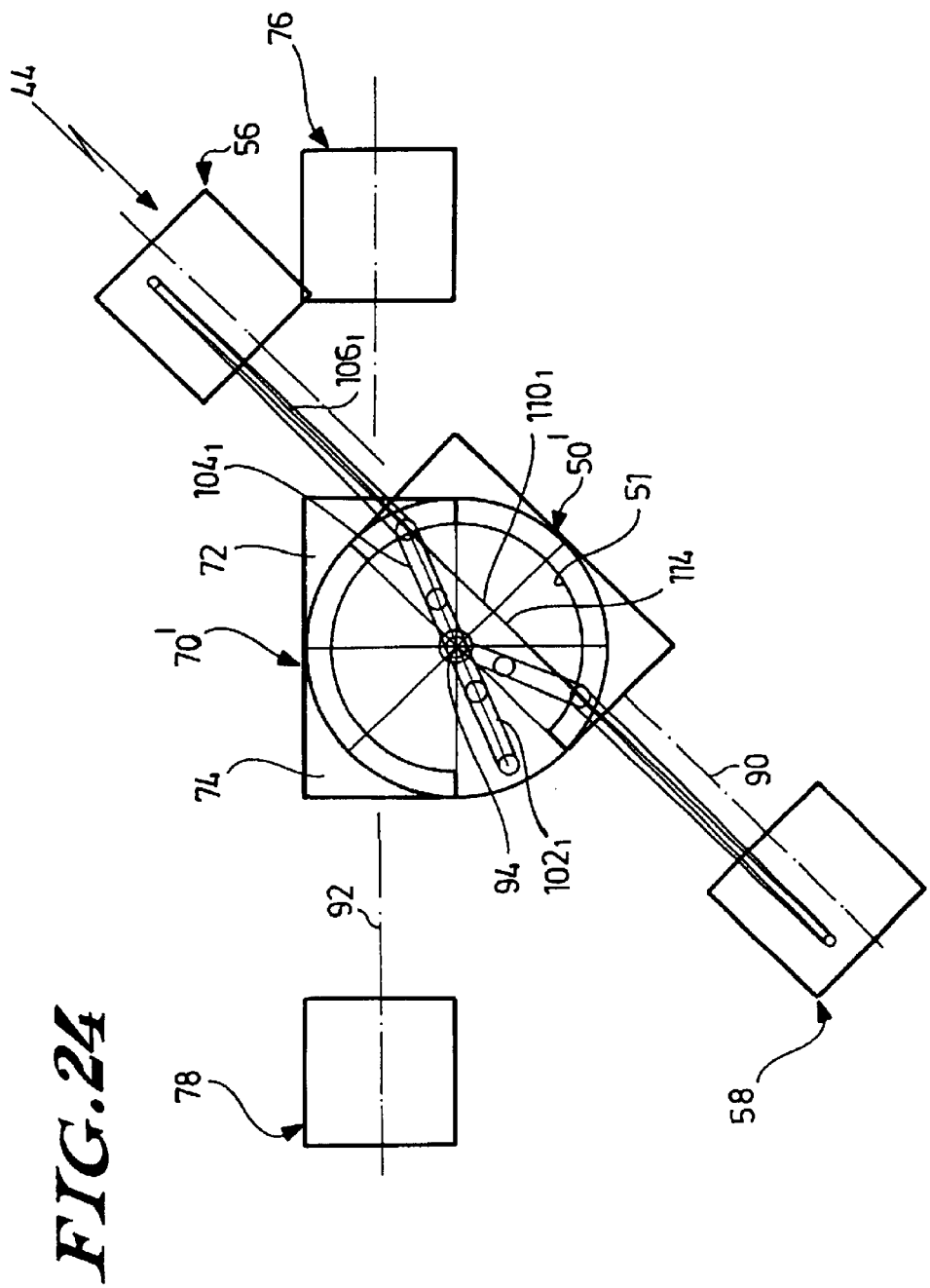
FIG. 24 shows a section along the line 24—24 in FIG. 23.

For instance, the formation of the first collimated incident branch $102_1$, which enters the solid body 10 and passes through it, from the incident branch 100 takes place by means of the radiation field shaping element 42a. The first collimated emerging branch $104_1$, propagating from the solid body 10 in the same direction as the incident branch $102_1$, in this case strikes the radiation field shaping element 42b that forms the first intermediate-focused branch $106_1$, which strikes the reflecting face 52 of the inner deviating prism 50', and is deviated by it to the reflecting face 60 and then to the reflecting face 62 of the first deviating unit 44 of the outer deviating prism 56, the focused sub-branch $108_1$ forming the focus $110_1$, starting from which the diverging sub-branch $112_1$ of the intermediate-focused branch $106_1$ propagates in the direction of the outer deviating prism 58 of the first deviating unit 44, and then is reflected by the reflecting faces 64 and 66 in such a way that it in turn strikes the reflecting face 54, which in turn deviates the intermediate-focused branch $106_1$ in the direction of the radiation field shaping element 42b which, for its part, in turn forms the second collimated incident branch $102_2$ by reflection (FIGS. 23, 24).

Figure 25:
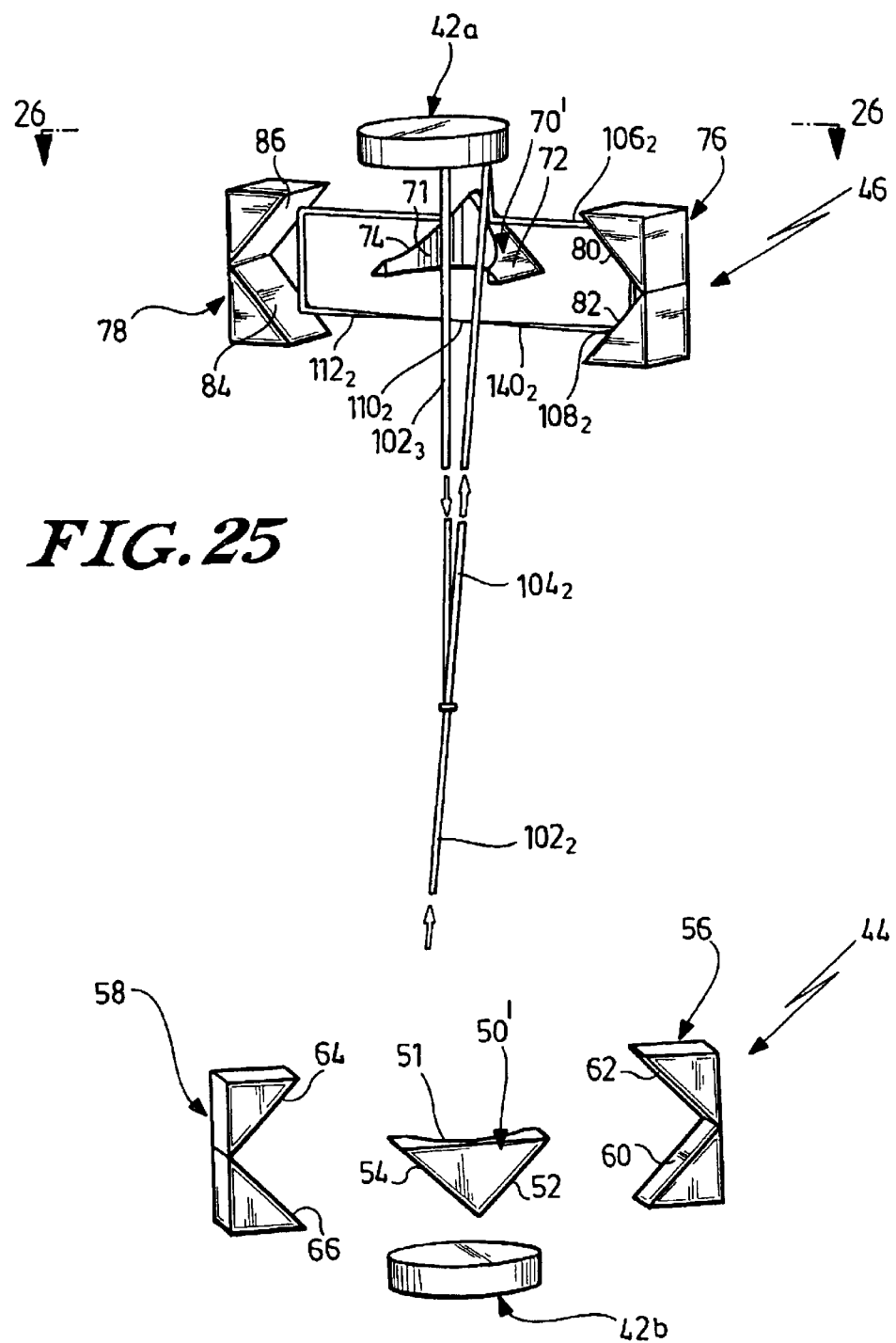
FIG. 25 shows a representation of the laser amplifier system according to FIG. 21, the second emerging branch, the second intermediate-focused branch and the third incident branch being represented of the amplifier radiation field.
Figure 26:
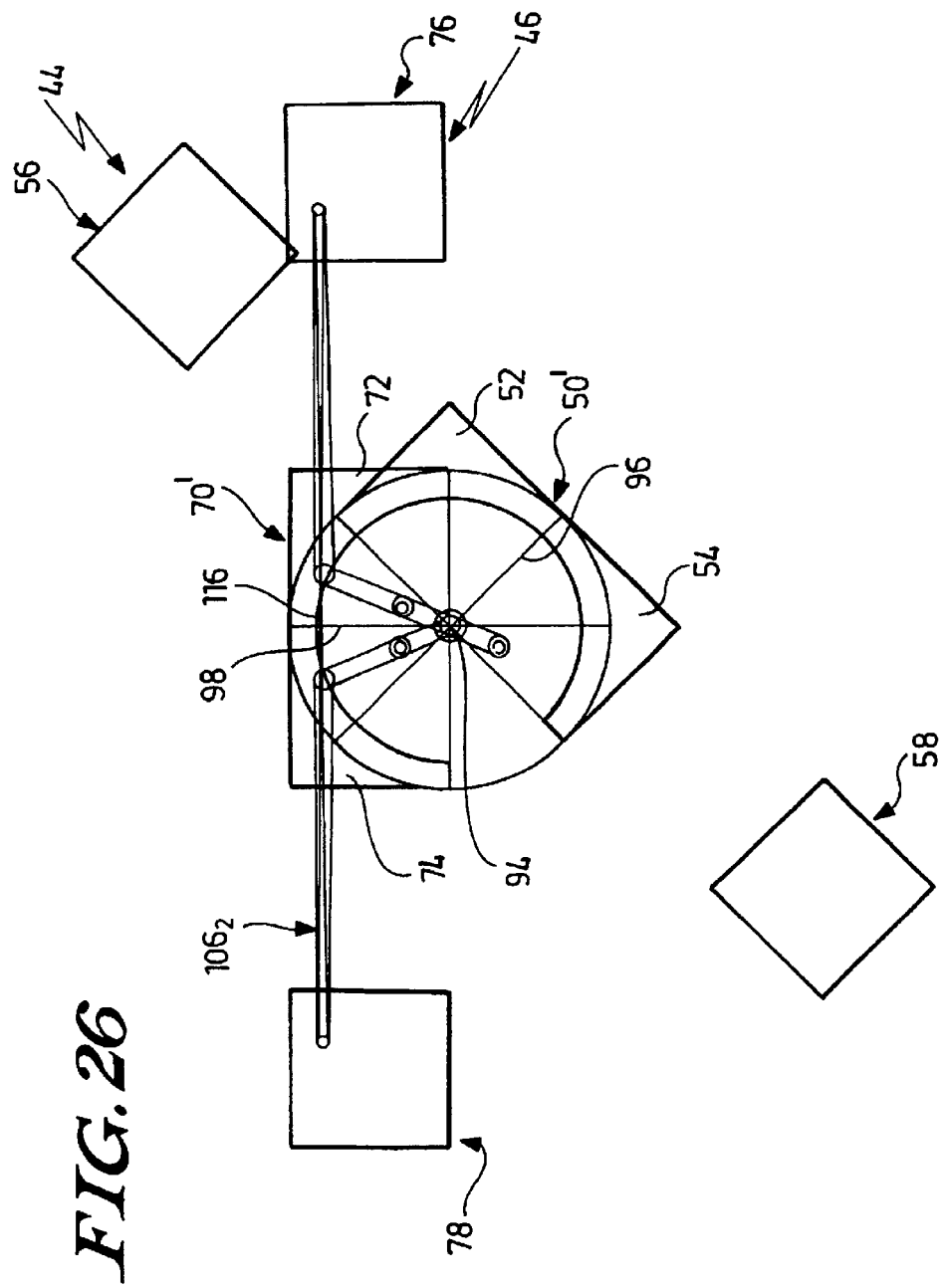
FIG. 26 shows a section along the line 26—26 in FIG. 25.

After transmission through the solid body 10, the second collimated emerging branch $104_2$ is formed, as represented in FIGS. 25, 26, which strikes the radiation field shaping element 42a that, for its part, in turn forms the second intermediate-collimated branch 106$_2$, which strikes the reflecting face 72 of the inner deviating prism 70 of the second deviating unit 46, is reflected by it to the reflecting face 80 and then to the reflecting face 82 of the outer deviating prism 76, so that the focused sub-branch 108$_2$ finally forms the intermediate focus 110$_2$, starting from which the divergent sub-branch 112$_2$ propagates in the direction of the outer deviating prism 78, is reflected by the reflection faces 84 and 86 and finally strikes the reflection face 74 of the inner deviating prism 70', in order to be deviated by it in the direction of the radiation field shaping element 42a.

Figure 27:
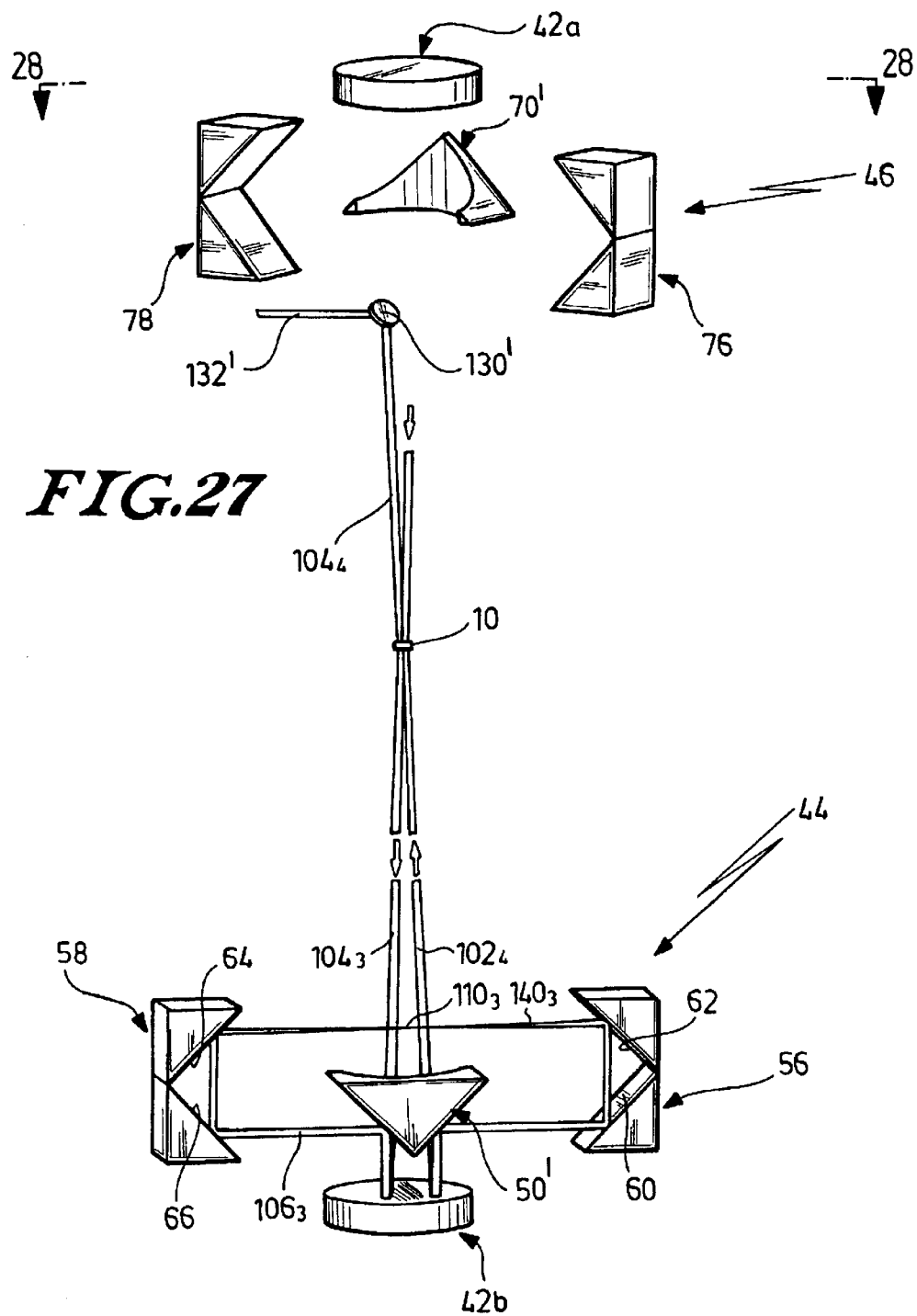
FIG. 27 shows a representation of the laser amplifier system in FIG. 21, the third emerging branch, the third intermediate-focused branch, the fourth incident branch and the fourth emerging branch being represented of the amplifier radiation field
Figure 28:
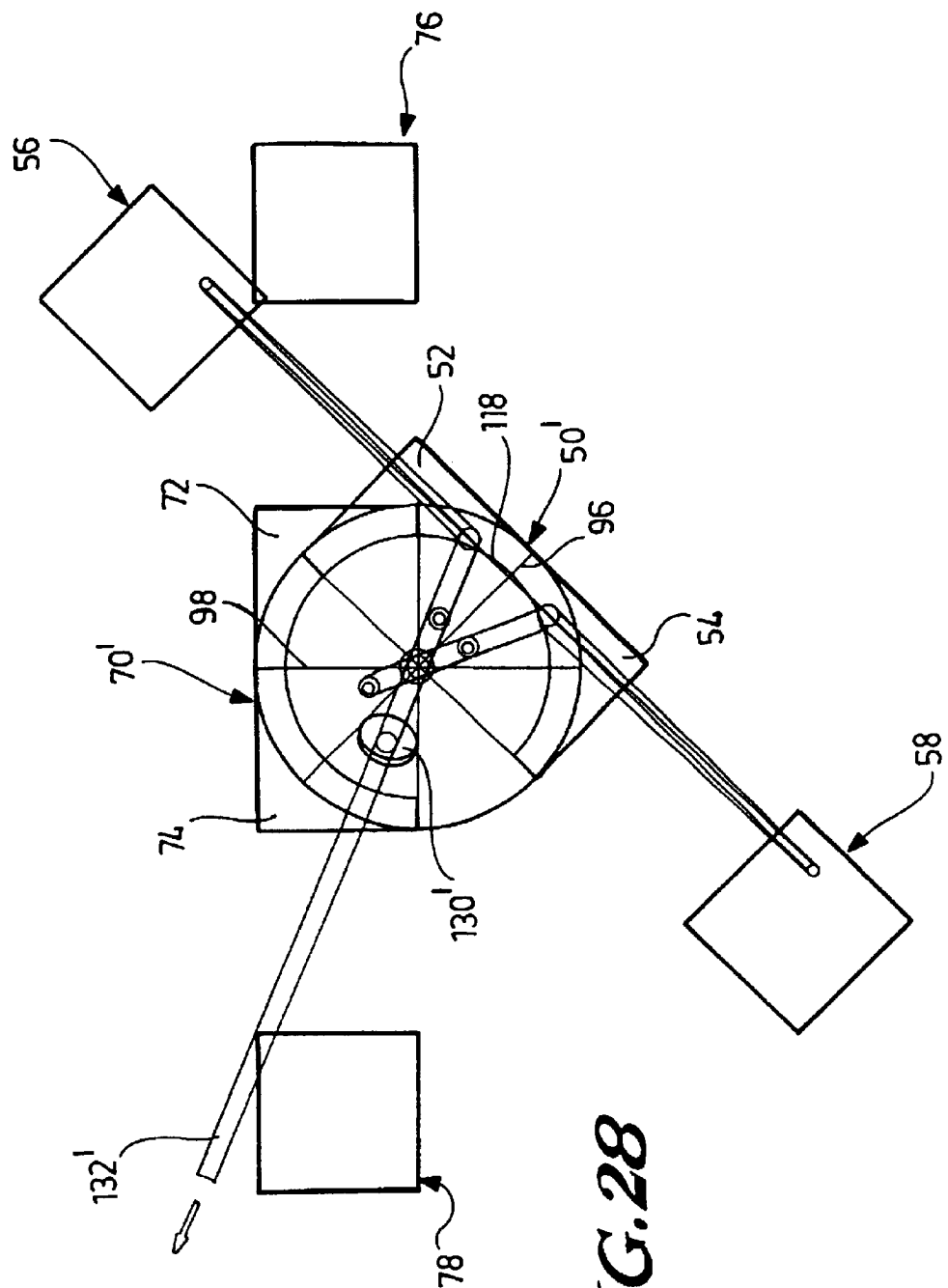
FIG. 28 shows a section along the line 28—28 in FIG. 27.

The inner deviating prism 70' produces the third incident branch 102$_3$, which in turn gives rise to the third collimated emerging branch 104$_3$ that strikes the radiation field shaping element 42b, which in turn produces the third intermediate-focused branch 106$_3$ that, after reflection at the reflection face 66 and the reflection face 64, produces the intermediate focus 110$_3$ with the focused sub-branch 108$_3$, so that the in turn resulting divergent sub-branch 112$_3$ strikes the outer deviating unit 56 and, after reflection at the reflection face 62 and the reflection face 60, in turn strikes the reflection face 52 of the inner deviating prism 50', which deviates the third intermediate-focused branch 106$_3$ onto the radiation field shaping element 42b that, from this third focused branch, as represented in FIGS. 27, 28, produces the fourth collimated incident branch 102$_4$ which becomes the fourth collimated emerging branch 104$_4$ after having passed through the solid body 10. This does not then strike the radiation field shaping element 42a, but rather it can be directly deviated through an extraction mirror 130' and form the extracted beam 132'.

It would, however, also be possible to make the fourth emerging branch 104$_4$ strike the radiation field shaping element 42a, and to extract it after the formation of a fourth intermediate-focused branch 106$_4$.

In the third exemplary embodiment as well, guiding of the intermediate-focused branches 106 in loops 140 and expansion thereof relative to the respective deviating symmetry plane 96 or 98, takes place in the deviating units 44 and 46 in the same way as in the first and second exemplary embodiments.

Wherever the same reference numbers are used in the second and third exemplary embodiments, and no other description of the various elements is given, comprehensive reference is made to the description relating to the first exemplary embodiment.

What is claimed is:

1. A laser amplifier system comprising:
   a solid body having a laser-active medium,
   an excitation source for producing an excited state of the laser-active medium,
   an amplifier radiation field which passes multiple times through the solid body and from which a laser beam can be extracted, and
   radiation field guiding optics, which guide the amplifier radiation field into the solid body in the form of a plurality of incident branches with respectively different trajectories and which leave the solid body in the form of as least one emerging branch with a respective trajectory different from the respectively different trajectories of the incident branches,
   the radiation field guiding optics including a focusing element and at least one set of optical deviating elements for forming, from at least one of the branches emerging from the solid body and after intermediate focusing, one incident branch which enters the solid body with a trajectory separate from this emerging branch,
   said intermediate focusing maintaining a cross-section of the incident branch essentially the same as a cross-section of the emerging branch.

2. The laser amplifier system as claimed in claim 1, wherein the incident branches always enter the same solid body.

3. The laser amplifier system as claimed in claim 2, wherein the incident branches always enter the same volume region of the solid body.

4. The laser amplifier system as claimed in claim 1, wherein the intermediate focusing takes place in the vicinity of a deviating unit of the radiation field guiding optics, said deviating unit being adapted to change the direction of an emerging branch introduced thereto in order to provide an incident branch.

5. The laser amplifier system as claimed in claim 4, wherein an intermediate focus lying between two deviating elements of the deviating unit is produced by the intermediate focusing.

6. The laser amplifier system as claimed in claim 5, wherein the intermediate focus lies approximately centrally between the two deviating units.

7. The laser amplifier system as claimed in claim 5, wherein the optical path between the deviating elements lying on either side of the intermediate focus is greater than a spacing between an input branch entering the deviating unit and an output branch emerging from the deviating unit.

8. The laser amplifier system as claimed in claim 7, wherein the optical path between the deviating elements lying on either side of the intermediate focus corresponds at least to two times the spacing of the input branch and the output branch.

9. The laser amplifier system as claimed in claim 4, wherein the deviating unit guides the amplifier radiation field in a loop which, in relation to an input branch and an output branch of the deviating unit, has an extent in an expansion direction which is greater than the spacing between the input branch and the output branch.

10. The laser amplifier system as claimed in claim 9, wherein the extent of the loop in the expansion direction is at least two times the spacing between the input branch and the output branch.

11. The laser amplifier system as claimed in claim 1, wherein the radiation field guiding optics form, from a plurality of emerging branches, a plurality of incident brandies with respective trajectories different from the emerging branches.

12. The laser amplifier system as claimed in claim 1, wherein the radiation field guiding optics form an amplifier radiation field in which the branches entering the solid body and the branches emerging from the solid body are collimated branches.

13. The laser amplifier system as claimed in claim 12, wherein the radiation field guiding optics are designed as at least singly recollimating.

14. The laser amplifier system as claimed in claim 13, wherein the radiation field guiding optics are designed as multiply recollimating.

15. The laser amplifier system as claimed in claim 13, wherein an intermediate-focused branch is formed by the radiation field guiding optics during each recollimation.

16. The laser amplifier system as claimed in claim 15, wherein the intermediate-focused branch passes through a deviating unit of the radiation field guiding optics, said deviating unit being adapted to change the direction of an emerging branch introduced thereto in order to provide an incident branch.

17. The laser amplifier system as claimed in claim 13, wherein the radiation field guiding optics have recollimating optics for each recollimation.

18. The laser amplifier system as claimed in claim 17, wherein each intermediate-focused branch travels along an optical path which corresponds to two times the focal length of the respective recollimating optics.

19. The laser amplifier system as claimed in claim 18, wherein the radiation field shaping element comprises a lens system.

20. The laser amplifier system as claimed in claim 18, wherein the radiation field shaping element is designed as a reflecting element.

21. The laser amplifier system as claimed in claim 20, wherein the radiation field shaping element is designed as a concave mirror.

22. The laser amplifier system as claimed in claim 17, wherein all the recollimating optics have the same focal length.

23. The laser amplifier system as claimed in claim 17, wherein a plurality of recollimating optics are combined to form a radiation field shaping element.

24. The laser amplifier system as claimed in claim 23, wherein the recollimating optics arranged on one side of the solid body are combined to form a radiation field shaping element.

25. The laser amplifier system as claimed in claim 24, wherein all the recollimating optics are combined to form a radiation field shaping element.

26. The laser amplifier system as claimed in claim 1, wherein the radiation field guiding optics comprise at least two deviating units, each of these deviating units forming, from an input branch of the amplifier radiation field which is formed from one of the emerging branches, an output branch with a trajectory respectively separate therefrom, from which the corresponding incident branch is formed.

27. The laser amplifier system as claimed in claim 26, wherein at least one of the deviating units forms, from at least two input branches formed from branches emerging from the solid body, at least two output branches from which the corresponding branches entering the solid body are formed.

28. The laser amplifier system as claimed in claim 26, wherein the input branches of the amplifier radiation field hive trajectories spatially separate from one another.

29. The laser amplifier system as claimed in claim 28, wherein the input branches of the amplifier radiation field are arranged relative to one another at angular spacings around the mid-axis of the radiation field guiding optics.

30. The laser amplifier system as claimed in claim 26, wherein the output branches have separate trajectories from one another.

31. The laser amplifier system as claimed in claim 1, wherein the radiation field guiding optics comprise two deviating units and an output branch of each of the deviating units leads to the formation of a branch which enters the solid body, from which in turn, after it has passed through the solid body, an emerging branch is produced, from which an input branch of the respective other deviating unit is formed.

32. The laser amplifier system as claimed in claim 1, wherein:

the radiation field guiding optics comprise a first and a second deviating unit, and the first and second deviating units, respectively by deviating the amplifier radiation field relative to a single deviating symmetry plane assigned to the respective deviating unit, convert at least three input branches, formed from at least three different emerging branches of the amplifier radiation field, into at least three output branches which have trajectories correspondingly respectively separate from the input branches and from which at least three incident branches are produced.

33. The laser amplifier system, as claimed in claim 1, wherein the radiation field guiding optics have at least one deviating unit forming, from at least one input branch, an output branch which is offset in relation to a mid-axis of the radiation field guiding optics by an angular spacing such that at least one further input branch lies in the angle range between this input branch and the output branch farmed therefrom.

34. The laser amplifier system as claimed in claim 33, wherein the first and second deviating symmetry planes are oriented at an angle with respect to one another which preferably corresponds to 360° divided by the sum of the incident and emerging branches arising during a pass of the amplifier radiation field through the radiation field guiding optics and the solid body.

35. A laser amplifier comprising:

a solid body comprising a laser-active medium, an excitation source for producing an excited state of the laser-active medium, an amplifier radiation field which passes multiple times through the solid body and from which a laser beam can be extracted, and radiation field guiding optics, which guide the amplifier radiation field into the solid body in the form of a plurality of incident branches with respectively different trajectories and which leave the solid body in the form of a plurality of emerging branches with respectively different trajectories which are different from the respectively different trajectories of the incident branches, all of said incident branches entering the same volume region of said solid body and all of said emerging branches emerging from said same volume region, the radiation field guiding optics comprising a focusing element, a first deviating unit adapted to change the direction of the amplifier radiation field relative to a first deviating symmetry plane, and a second deviating unit, adapted to change the direction of the amplifier radiation field relative to a second deviating symmetry plane, the deviating symmetry planes being oriented at an angle with respect to one another, each deviating unit forming, from at least one of the branches emerging from the solid body, one incident branch which enters the solid body with a trajectory separate from this emerging branch said focusing element maintaining a cross-section of the emerging and incident branches essentially the same.

36. The laser amplifier system as claimed in claim 35, wherein at least one of the deviating symmetry planes runs parallel to the mid-axis.

37. The laser amplifier system as claimed in claim 36, wherein at leant one of the deviating symmetry planes runs through the mid-axis.

38. A laser amplifier system comprising:

a solid body comprising a laser-active medium, an excitation source for producing an excited state of the laser-active medium, an amplifier radiation field which passes multiple times through the solid body and from which a laser beam can be extracted, radiation field guiding optics, which guide the amplifier radiation field into the solid body in the form of a plurality of incident branches with respectively different trajectories and which leave the solid body in the form of a plurality of emerging branches with respectively different trajectories which are different from the respectively different trajectories of the incident branches, said radiation guiding optics guiding said amplifier radiation field to form input branches from at least some of said emerging branches, and output branches which form at least some of said incident branches, each of said input branches and each of said output branches being arranged in a separate space segment of a series of space segments arranged around a mid axis of the radiation field guiding optics, the radiation field guiding optics having at least one deviating unit adapted to change the direction of at least one of the input branches to form one output branch.

39. The laser amplifier system as claimed in claim 38, wherein the output branches are arranged relative to one another and relative to the input branches at angular spacings around the mid-axis of the radiation field guiding optics.

40. The laser amplifier system as claimed in claim 38, wherein the input branches and output branches produced during a pass of the amplifier radiation field through the radiation field guiding optics are arranged without overlap in the space around the mid-axis of the radiation field guiding optics.

41. The laser amplifier system as claimed in claim 40, wherein the input brunches and output branches, as well as an incident branch of the amplifier radiation field, during a pass through the radiation field guiding optics and the solid body are arranged without overlap in the space around the mid-axis of the radiation field guiding optics.

42. The laser amplifier system as claimed in claim 41, wherein the space segments are arranged in such a way that they stretch over approximately the same angle range around the mid-axis.

43. The laser amplifier system as claimed in claim 38, wherein the input branches and the output branches extend inside the apace segments transversely with respect to their propagation direction.

44. The laser amplifier system as claimed in claim 43, wherein the space segments of the input branches and of the output branches, as well as the space segment of the incident branch, essentially enclose the mid-axis.

45. A laser amplifier system comprising:

a solid body comprising a laser-active medium, an excitation source for producing an excited state of the laser-active medium, an amplifier radiation geld which passes multiple times through the solid body and from which a laser beam having a cross-sectional size can be extracted, and radiation field guiding optics including at least one focusing element which guide the amplifier radiation field into the solid body in the form of a plurality of incident branches with respectively different trajectories and which leave the solid body in the form of a plurality of emerging branches with respectively different trajectories which are different from the respectively different trajectories of the incident branches, said at least one focusing element allowing each of said incident branches and each of said emerging branches to be maintained at essentially the same cross-sectional size as said laser beam with said branches being arranged around a mid axis of the radiation field guiding optics and enclosing approximately the same angle with said mid axis, the radiation field guiding optics comprising at least one deviating unit adapted to change the direction of at least one of the branches emerging from the solid body, to form a branch which enters the solid body with a trajectory separate from this emerging branch.

* * * * *

UNITED STATES PATENT AND TRADEMARK OFFICE
CERTIFICATE OF CORRECTION

PATENT NO.   : 6,778,580 B2
DATED        : August 17, 2004
INVENTOR(S)  : Erhard et al.

It is certified that error appears in the above-identified patent and that said Letters Patent is hereby corrected as shown below:

Column 15,
Line 48, "hive" should read -- have --.

Column 16,
Line 10, after the word "system" delete the ",".
Line 17, "farmed" should read -- formed --.
Line 48, delete the "," after the word "unit".
Line 62, "leant" should read -- least --.

Column 17,
Line 32, "brunches" should read -- branches --.

Column 18,
Line 3, "apace" should read -- space --.
Line 15, "geld" should read -- field --.

Signed and Sealed this

Fourth Day of January, 2005

JON W. DUDAS
*Director of the United States Patent and Trademark Office*